(12) United States Patent
Nonaka et al.

(10) Patent No.: US 7,143,591 B2
(45) Date of Patent: Dec. 5, 2006

(54) REFRIGERATOR

(75) Inventors: Hikaru Nonaka, Ibaraki (JP); Shinji Hirai, Ibaraki (JP); Yoshihiko Uenoyama, Takatsuki (JP); Tsutomu Sakuma, Ibaraki (JP); Susumu Saruta, Osaka (JP); Shoji Hashimoto, Ibaraki (JP)

(73) Assignees: Kabushiki Kaisha Toshiba, Tokyo (JP); Toshiba Consumer Marketing Corporation, Tokyo (JP); Toshiba Ha Products Co., Ltd, Osaka (JP)

( * ) Notice: Subject to any disclaimer, the term of this patent is extended or adjusted under 35 U.S.C. 154(b) by 212 days.

(21) Appl. No.: 10/494,449

(22) PCT Filed: Oct. 30, 2002

(86) PCT No.: PCT/JP02/11324

§ 371 (c)(1),
(2), (4) Date: Sep. 21, 2004

(87) PCT Pub. No.: WO03/038352

PCT Pub. Date: May 8, 2003

(65) Prior Publication Data

US 2005/0039469 A1    Feb. 24, 2005

(30) Foreign Application Priority Data

Nov. 1, 2001    (JP) .............................. 2001-336602

(51) Int. Cl.
*G01K 13/00*    (2006.01)
(52) U.S. Cl. ........................................................ 62/129
(58) Field of Classification Search ................. 62/126, 62/127, 129, 208; 165/70
See application file for complete search history.

(56) References Cited

U.S. PATENT DOCUMENTS

| | | | | |
|---|---|---|---|---|
| 5,009,076 A | * | 4/1991 | Winslow ....................... | 62/129 |
| 5,150,584 A | * | 9/1992 | Tomasov et al. .............. | 62/209 |
| 5,251,453 A | * | 10/1993 | Stanke et al. .................. | 62/126 |
| 5,301,514 A | * | 4/1994 | Bessler .......................... | 62/126 |
| 5,351,500 A | * | 10/1994 | Morrow ......................... | 62/129 |
| 5,457,965 A | * | 10/1995 | Blair et al. .................... | 62/129 |
| 5,481,884 A | * | 1/1996 | Scoccia ......................... | 62/129 |
| 5,524,445 A | * | 6/1996 | Morrow et al. ............... | 62/129 |
| 5,560,213 A | * | 10/1996 | Wieszt .......................... | 62/125 |
| 5,934,087 A | * | 8/1999 | Watanabe et al. ............. | 62/126 |
| 6,293,114 B1 | * | 9/2001 | Kamemoto .................... | 62/129 |
| 6,330,802 B1 | * | 12/2001 | Cummings et al. ........... | 62/129 |

FOREIGN PATENT DOCUMENTS

| | | | |
|---|---|---|---|
| JP | 56-71775 | | 6/1981 |
| JP | 6-180166 | | 6/1994 |
| JP | 7-19676 | | 1/1995 |
| JP | 8-128765 | | 5/1996 |
| JP | 9-42808 A | * | 2/1997 |
| JP | 11-211293 | | 8/1999 |
| JP | 2001-116419 | | 4/2001 |

\* cited by examiner

*Primary Examiner*—Mohammad M. Ali
(74) *Attorney, Agent, or Firm*—Pillsbury Winthrop Shaw Pittman LLP

(57) ABSTRACT

A refrigerator of the present invention includes a refrigerating cycle including a compressor, a condenser, an expander and an evaporator and filled with a flammable refrigerant, a load detector detecting a change in load of the compressor, and a control device detecting a damage which is a cause for leak of the refrigerant from the refrigerating cycle, based on a detection output of the load detector.

10 Claims, 21 Drawing Sheets

REFRIGERATOR

CROSS-REFERENCE TO RELATED APPLICATIONS

This application is the National Phase of International Application No. PCT/JP02/11324 filed Oct. 30, 2002, which designated the U.S. and was published on May 8, 2003 as International Publication No. WO 03/038352 A1. That application is based upon and claims the benefit of priority from prior Japanese Patent Application No. 2001-336602 filed Nov. 1, 2001. The contents of both International Application No. PCT/JP02/11324 and Japanese Patent Application No. 2001-336602 are incorporated herein by reference.

TECHNICAL FIELD

The present invention relates to refrigerators employing a flammable refrigerant such as hydrocarbon refrigerant, and more particularly to such a refrigerator in which leak of the refrigerant is detected.

TECHNICAL BACKGROUND

Substituting hydrocarbon (hereinafter "HC") refrigerants for a fleon one as a refrigerant in a refrigerating cycle has recently been proposed from a viewpoint of environmental protection. Since the HC refrigerant is flammable, a refrigerator employing the HC refrigerant is provided with security countermeasures so that electric components remain safe even upon occurrence of gas leak in view of refrigerant leak.

However, the refrigerant stays in the refrigerator when having leaked from a conduit near an evaporator installed in the refrigerator. The refrigerant flows out of the refrigerator when a door thereof has been opened. Further, when having leaked from a conduit outside the refrigerator, the refrigerant flows directly outside the refrigerator, whereupon the flammable refrigerant leaks out of the refrigerator.

The present invention was made in view of the foregoing circumstances and an object thereof is to provide a refrigerator in which when a hole resulting in leak of the refrigerant has occurred in a refrigerating cycle, such an occurrence of the hole is detected so that alarming can be carried out.

DISCLOSURE OF THE INVENTION

A refrigerator of the present invention in which a refrigerating cycle provided with a compressor, a condenser, an expander and an evaporator is filled with a flammable refrigerant, is characterized by a load detector detecting a change in load of the compressor, and a control device detecting a damage which is a cause for leak of the refrigerant from the refrigerating cycle, based on a detection output of the load detector.

In the above-described construction, when a hole is made as a damage in a component of the evaporator or the like constituting the refrigerating cycle or a conduit connecting between the components, the refrigerant leaks from the hole during operation of the compressor or air enters the refrigerating cycle, depending on a location of the hole, whereupon load of the compressor changes to a large degree. Accordingly, the leak of refrigerant can be detected by detecting changes in the load of the compressor and further, the hole formed in the conduit of the refrigerating cycle can be detected.

In this case, it can be determined by the control device which a part of the refrigerating cycle in which the damage has been produced, a high pressure side from the compressor to the expander or a low pressure side from the expander to the compressor, on the basis of increase or decrease in the load of the compressor indicated by the detection output of the load detector. In this case, when the detection signal of the load detector indicates that the load of the compressor is at or above a predetermined value relative to a normal state, the control device determines that the damage has occurred at the low pressure side. When the detection signal of the load detector indicates that the load of the compressor is at or below a predetermined value relative to a normal state, the control device determines that the damage has occurred at the high pressure side.

When the location of the hole is at the low pressure side, the load of the compressor is increased since air enters the refrigerating cycle through the hole. On the other hand, when the location of the hole is at the high pressure side, the refrigerant leaks from the hole such that the discharge side pressure of the compressor is reduced, whereupon the load of the compressor is decreased.

BEST MODE FOR CARRYING OUT THE INVENTION

The present invention will be described in more detail with reference to the accompanying drawings.

Figure 6:
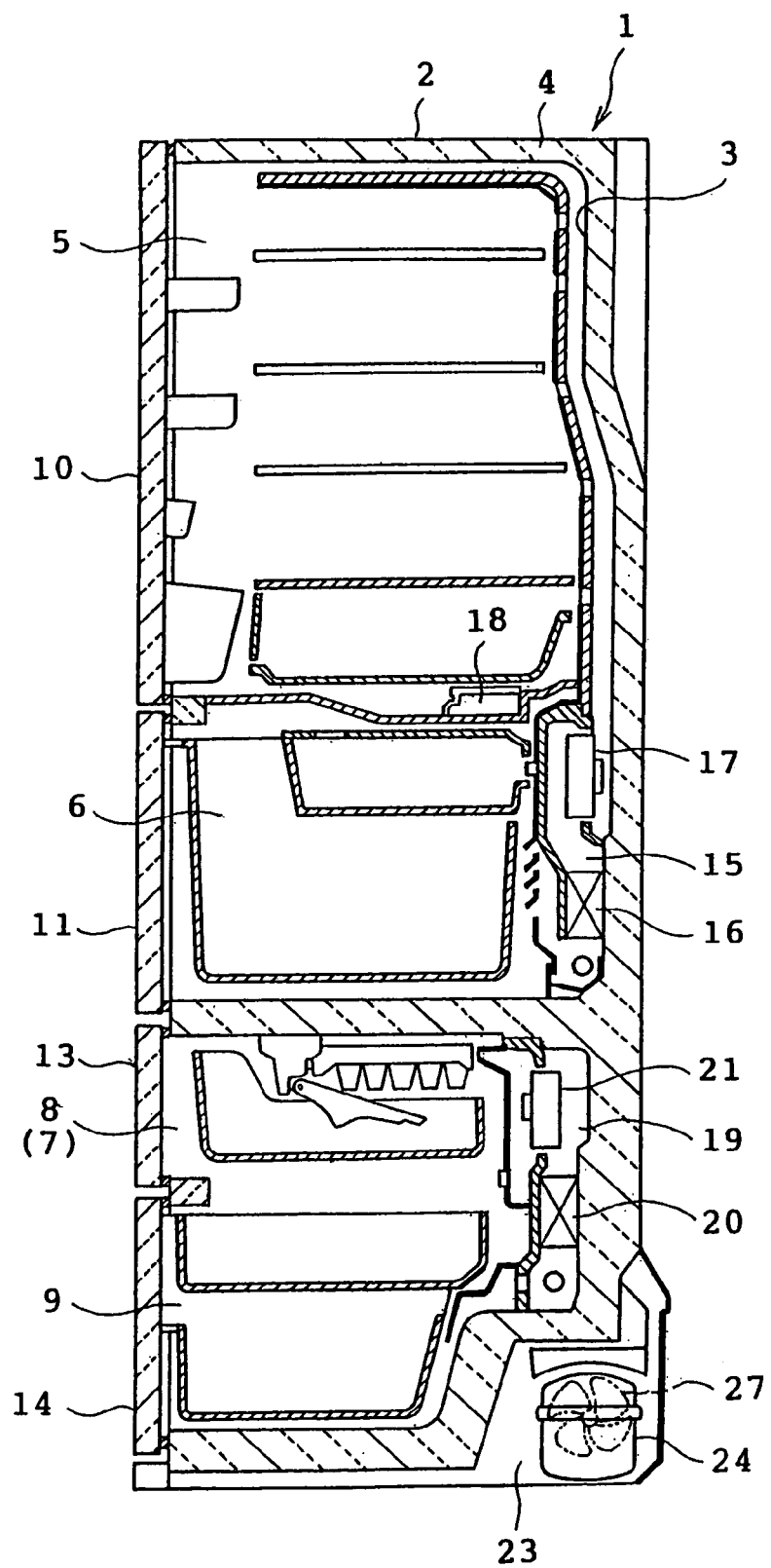
FIG. 6 is a sectional view of the refrigerator.
Figure 7:
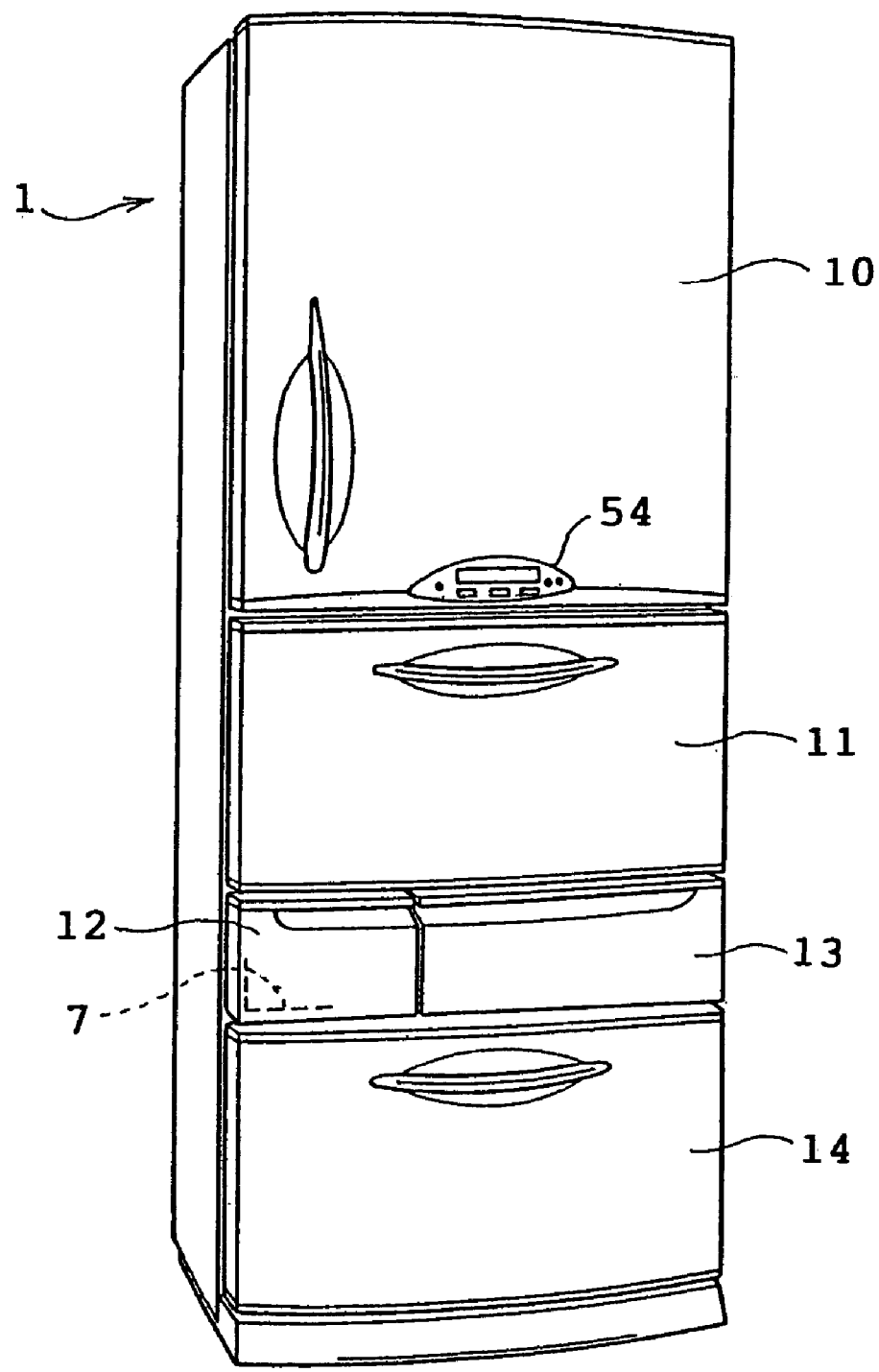
FIG. 7 is a perspective view of the refrigerator.

In FIGS. 6 and 7, first, a refrigerator body 1 comprises an outer box 2 made of a steel plate and an inner box 3 made of plastic combined with the outer box. A space defined between the outer and inner boxes 2 and 3 is filled with a heat-insulating material 4 comprising, for example, urethane foam so that a heat-insulated box is constructed. A plurality of storage compartments are defined in the refrigerator body 1. In the embodiment, a cold storage compartment 5, a vegetable compartment 6, a mode-changeable compartment 7 and an ice-making compartment 8 horizontally juxtaposed with the compartment 7, and a freezing compartment 9 are defined sequentially from the upper interior. The cold storage and vegetable compartments 5 and 6 constitute storage compartments in a cold storage temperature zone, whereas the ice-making and freezing compartments 8 and 9 constitute storage compartments in a freezing temperature zone. A hingedly mounted heat-insulating door 10 is provided on the front of the cold storage compartment 5. Drawable heat-insulating doors 11 to 14 are mounted on the fronts of the vegetable, mode-changeable, ice-making and freezing compartments 6 to 9 respectively.

A first evaporator chamber 15 is provided in the rear of the vegetable compartment 6. A cold storage evaporator 16, an R fan 17 constituting a cold storage cold air circulating fan and the like are housed in the first evaporator chamber 15. Upon drive of the R fan 17, cold air cooled by the cold storage evaporator 16 is supplied into the cold storage compartment 5 and thereafter returned through the vegetable compartment 6 into the first evaporator chamber 15, whereupon the atmospheres in the cold storage and vegetable compartments 5 and 6 are cooled.

An optical plasma deodorizer 18 is provided in a passage of cold air flowing from the cold storage compartment 5 to the vegetable compartment 6. The deodorizer 18 comprises a pair of electrodes and a photocatalyst, such as titanium oxide, disposed between the electrodes. When an impulse voltage is applied between the paired electrodes, a corona discharge is caused such that ultraviolet rays are produced and ozone is produced. The photocatalyst, when activated by the produced ultraviolet rays, decomposes ethylene as aging hormone of vegetable and the ozone decomposes odor component thereby to deodorize air.

A second evaporator chamber 19 is provided in the rear of the freezing compartment 9. A freezing evaporator 20, an F fan 21 constituting a freezing cold air circulating fan and the like are housed in the second evaporator chamber 19. Upon drive of the F fan 21, cold air cooled by the freezing evaporator 20 is supplied into the ice-making and freezing compartments 8 and 9. The cold air is then supplied through a damper 22 (see FIG. 5) into the mode-changeable compartment 7, thereafter being returned into the second evaporator chamber 19. Thus, the cold air is circulated such that atmospheres in the ice-making and freezing compartments 8 and 9 and the mode-changeable compartment 7. In this case, an amount of cold air supplied into the mode-changeable compartment 7 is adjusted by the damper 22, whereby the temperature in the mode-changeable compartment 7 is adjusted.

A machine compartment 23 is formed outside the bottom of the refrigerator body 1. In the machine compartment 23 are housed a compressor 24, a main condenser 26 (see FIG. 4) composing a part of a condenser 25, a compressor 24, a C fan 27 composing a cooling fan for cooling the main condenser 26 and the like. The compressor 24 and the main condenser 26 constitute a refrigerating cycle together with the cold storage evaporator 16, the freezing evaporator 20 and the like. An HC (hydrocarbon) refrigerant is employed as one used in the refrigerating cycle.

Figure 4:
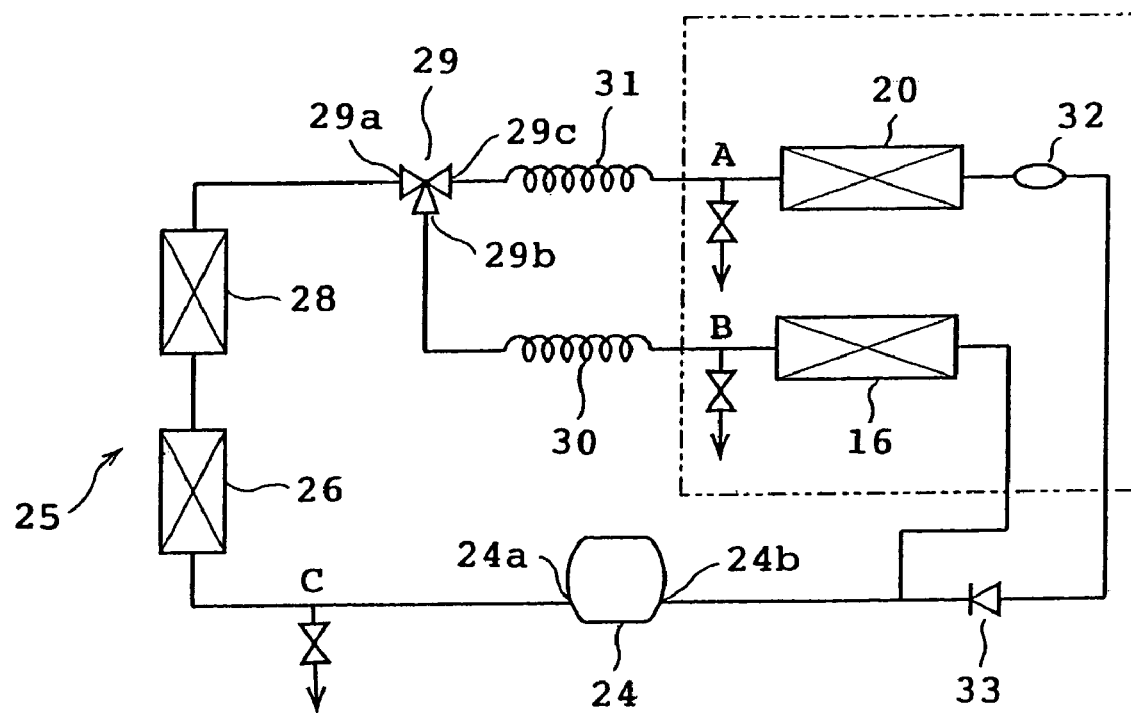
FIG. 4 shows an arrangement of a refrigerating cycle.

FIG. 4 shows an arrangement of the refrigerating cycle. As shown, the main condenser 26 is connected to a discharge port 24a of the compressor 24. A dew-condensation preventing clean pipe 28 is connected in series to the main condenser 26 and extends along the openings of the cold storage, vegetable, mode-changeable, ice-making and freezing compartments 5 to 9 so as to be located on the front inside of the outer box 2. The main condenser 26 and the clean pipe 28 constitute the condenser 25.

The aforesaid compressor 24 is of the reciprocating type and check valves (not shown) serving as a reverse flow preventing units are provided in discharge and suction ports 24a and 24b respectively. The check valve of the discharge port 24a prevents the refrigerant from reverse flow from the condenser 25 side into the compressor 24, whereas the check valve of the suction port 24b prevents the refrigerant from reverse flow from the compressor 24 to the evaporator 16 and 20 side.

An exit of the clean pipe 28 which is also an exit of the condenser 25 is connected to an inlet port 29a of a three-way valve 29 serving as a valve unit. Two outlet ports 29b and 29c of the three-way valve 29 are connected via a cold storage side capillary tube 30 and a freezing side capillary tube 31 both serving as expanders to entrances of the cold storage and freezing evaporators 16 and 20 respectively. An exit of the cold storage evaporator 16 is connected to a suction port 24b of the compressor 24, whereas an exit of the freezing evaporator 20 is connected via an accumulator 32 and check valve 33 in turn to the suction port 24b of the compressor 24. The three-way valve 29 is of a motor driven type and is constructed to be switchable between a case where the inlet port 29a communicates with either one of the outlet ports 29b and 29c and a case where the inlet port 29a communicates with neither outlet port or closed.

In the above-described refrigerating cycle, the compressor 24 is operated when a cold storage compartment temperature sensor 34 or a freezing compartment temperature sensor 35 (see FIG. 5) has detected a temperature which is at or above a respective predetermined ON temperature for the cold storage or freezing compartment 5 or 9. The compressor 24 is stopped when the cold storage and freezing compartment temperature sensors 34 and 35 have detected temperatures which are at or below respective predetermined OFF temperatures for the cold storage and freezing compartments 5 and 9.

When the inlet port 29a of the three-way valve 29 communicates with one outlet port 29b during operation of the compressor 24, the liquid refrigerant condensed by the condenser 25 is supplied via the cold storage capillary tube 30 into the cold storage evaporator 16 (hereinafter, "R refrigeration"). When the cold storage compartment temperature sensor 34 has detected the predetermined OFF temperature, the three-way valve 29 is switched so that the inlet port 29a communicates with the other outlet port 29c, whereby the liquid refrigerant is supplied via the freezing capillary tube 31 into the freezing evaporator 20 (hereinafter, "F refrigeration").

Figure 5:
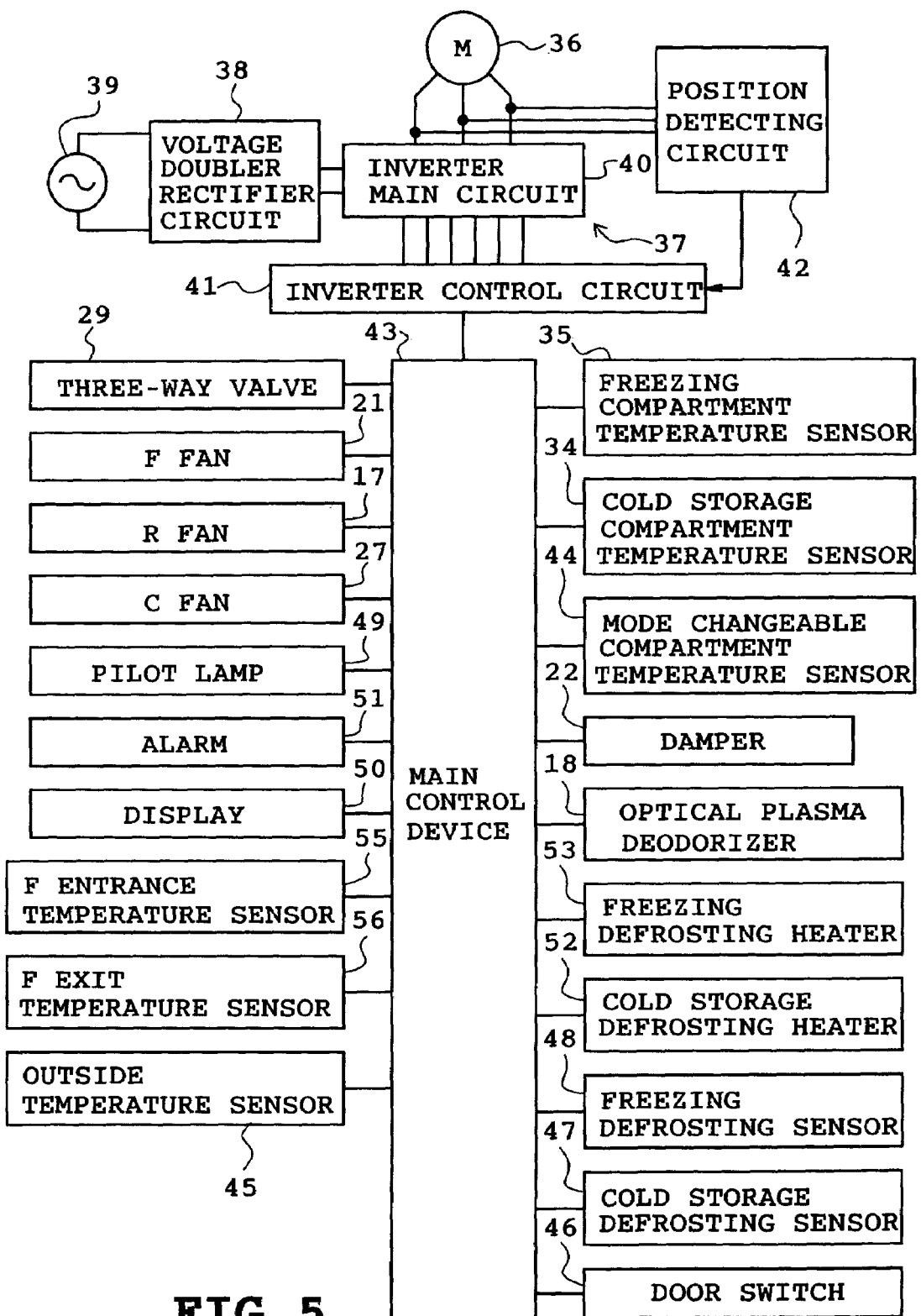
FIG. 5 is a block diagram showing an electrical arrangement.

FIG. 5 shows an electrical arrangement of the refrigerator. Firstly, an electric motor 36 (hereinafter, "compressor motor") as a driving source of the compressor 24 comprises a three-phase brushless DC motor and is controlled by an inverter 37. More specifically, a 100 V commercial single-phase AC power supply 39 is connected to an input terminal of a voltage doubler rectifier circuit 38 comprising a diode bridge circuit and a voltage doubler circuit. The voltage doubler rectifier circuit 38 delivers a DC voltage obtained by doubling voltage of about 140 V which is a peak voltage of the AC power supply 39. An inverter main circuit 40 of the inverter 37 is connected between output terminals of the voltage doubler rectifier circuit 38.

The inverter circuit 40 comprises a three-phase bridge circuit including six switching transistors (not shown). Windings of the compressor motor 36 are connected to output terminals of the inverter circuit 40. When an on-off control is carried out for the transistors of the inverter circuit 40 in a predetermined sequence, the windings of the compressor motor 36 are repeatedly energized with a phase difference of an electrical angle of about 120°, whereby a rotor (not shown) is rotated.

Each transistor of the inverter main circuit 40 is controlled so as to be turned on and off by a pulse width modulated signal (hereinafter, "PWM signal") as a drive signal supplied from an inverter control circuit 41. The inverter control circuit 41 mainly comprises a microcomputer. A ROM of the microcomputer stores duty (reference duty) for a unit angle so that voltage is approximated to a sine wave over an electrical angle of 360°. The PWM signal based on the reference duty is supplied to each transistor of the inverter main circuit 40 so that an approximate sine wave voltage is applied to the winding of the compressor motor 36.

On the other hand, the rotor of the compressor motor 36 comprises a permanent magnet rotor and a rotational position of the rotor is detected by a position detecting circuit 42. A position signal generated by the position detecting circuit 42 is supplied to the inverter main circuit 40. The inverter control circuit 41 detects the commutation timing for each transistor of the inverter main circuit 40 based on the position signal.

The inverter control circuit 40 further detects a rotational speed of the rotor from the position signal and compares the detected rotational speed to a command speed supplied from a main control device 43 serving as a control unit. The inverter control circuit 40 determines a speed deviation from the detected speed and command speed and supplies a duty signal corresponding to the speed deviation to the inverter control circuit 41. The inverter control circuit 41 changes the aforesaid reference duty on the basis of the supplied duty signal so that the rotational speed of the rotor of the compressor motor 36 agrees with a command speed. The inverter control circuit 41 supplies the aforesaid duty signal also to the main control device 43. The main control device 43 can obtain load of the compressor motor 36 by calculation from the supplied duty signal.

To the main control device 43 are connected various sensors including the aforesaid cold storage compartment temperature sensor 34 and freezing compartment temperature sensor 35, a mode changeable compartment temperature sensor 44, an outside temperature sensor 45, door switch 46, cold storage defrosting sensor 47, freezing defrosting sensor 48, the aforesaid R fan 17, optical plasma deodorizer 18, F fan 21, damper 22, C fan 29, a pilot lamp 49, a display 50 comprising liquid crystal, an alarm 51 serving as an informing unit, a cold storage defrosting heater 52 and a freezing defrosting heater 53.

The cold storage compartment temperature sensor 34 and freezing compartment temperature sensor 35 detect temperatures in the cold storage and freezing compartments 5 and 9 respectively. The outside temperature sensor 45 detects a temperature outside the refrigerator. The main control device 43 supplies a command speed of the compressor motor 36 to the inverter control circuit 41 based on the temperatures detected by these temperature sensors The main control device 43 further controls the R fan 17, F fan 21 and three-way valve 29.

The mode changeable compartment temperature sensor 44 detects a temperature in the mode changeable compartment 12. The damper 22 controlling cold air supply to the mode changeable compartment 12 is opened and closed according to the detected temperature. The door switch 46 detects an open state of the door 10 of the cold storage compartment 5. The pilot lamp 49 illuminating the interior of the cold storage compartment 5 is turned on when the open state of the door 10 has been detected. The R fan 17 and F fan 21 are driven in the R refrigeration and F refrigeration respectively. The R fan 17 is turned off when the open state of the door 10 has been detected by the door switch 46.

The cold storage and freezing defrosting heaters 52 and 53 are provided on the cold storage and freezing evaporators 16 and 20 respectively. When an accumulated operating time of the compressor 24 reaches a predetermined time, the cold storage and freezing defrosting heaters 52 and 53 are energized so that frost adherent to the cold storage and freezing evaporators 16 and 20 are melted. Each of the cold storage and freezing defrosting sensor 47 and 48 comprises a temperature sensor. When these sensors 47 and 48 detect temperatures which are at or above predetermined temperatures respectively, the defrosting heaters 52 and 53 are deenergized so that defrosting is finished. Further, the display 50 is provided on a panel 54 (see FIG. 7) disposed on the door 10 of the cold storage compartment 5 and displays temperatures in the cold storage compartment 5 and the freezing compartment 9 and the like. The alarm 51 comprises an oscillator and is provided inside the panel 54.

A freezing evaporator entrance temperature sensor (hereinafter, "F entrance temperature sensor") 55 and a freezing evaporator exit temperature sensor (hereinafter, "F exit temperature sensor") 56 are provided in the entrance and exit of the freezing evaporator 20 for detecting temperatures in the entrance and exit respectively. Detection signals generated by the temperature sensors 55 and 56 are supplied to the main control device 43.

Further, the main control device 43 obtains load of the compressor motor 36 from the duty signal supplied from the inverter control circuit 41 by calculation. The main control device 43 compares the obtained actual load to previously stored normal load, thereby determining an occurrence and location of damage. The normal load may be one obtained in an actual operation under the conditions of an amount of storage, R refrigeration, F refrigeration, power supply to the refrigerator, quick ice-making in which ice making is quickly carried out, outside temperature, number of times of operation of the doors 10 to 14 and the like or loads of previous several times of R refrigeration and F refrigeration may be averaged into normal loads of R refrigeration and F refrigeration.

The inventors conducted an experiment to measure temperatures at the entrances and exits of the cold storage evaporator 16 and freezing evaporator 20 in each of the normal condition and a condition where damage has occurred, changes in the load of the compressor 24, and changes in the refrigerant gas density in each of the refrigerator and machine compartment in the case where damage or for example, perforation has occurred. In the experiment, the holes were located in a conduit between the freezing capillary tube 31 and the freezing evaporator 20 as shown by A in FIG. 4, a conduit between the cold storage capillary tube 31 and the cold storage evaporator 20 as shown by B and a conduit between the compressor 24 and the main condenser 26. Regarding the hole, a hole having a diameter of 0.1 mm was formed in each location of occurrence.

Figure 8:
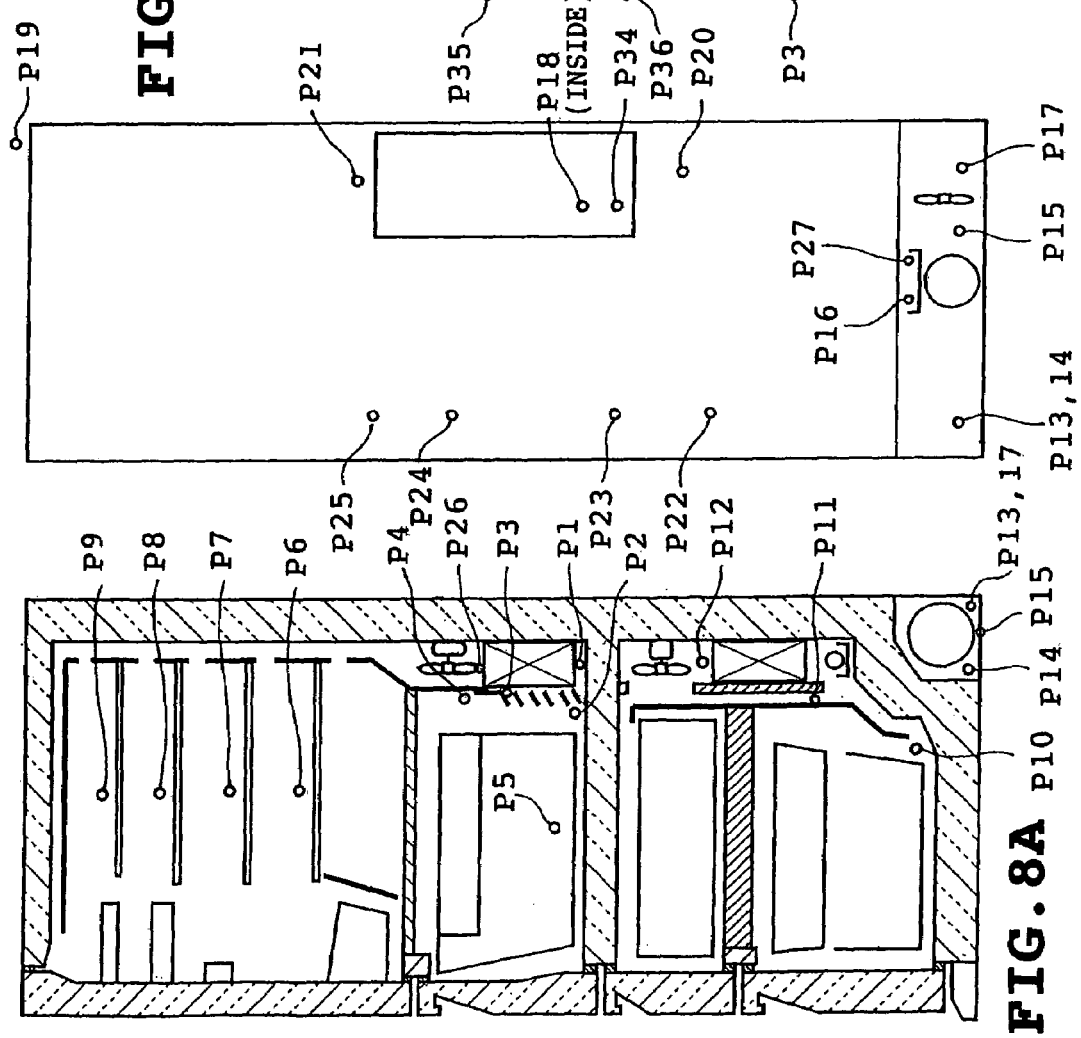
FIGS. 8A–8C illustrate detected locations of refrigerant gas leak.

In the refrigerating cycle, a high pressure side is located between the outlet of the compressor and the capillary tube, whereas a low pressure side is located between the capillary tube and the inlet of the compressor. Accordingly, the locations A and B between the both capillary tubes 30 and 31, and the inlet 24b of the compressor 24 are at the low pressure side and the leaked refrigerant gas remains in the refrigerator. Further, a location C between the outlet 24a of the compressor 24 and both capillary tubes 30 and 31 is at the high pressure side. Since the location C is located in the machine compartment 23, the refrigerant gas leaked remains in the machine compartment 23. In FIGS. 8A to 8C, numerals designate locations where the refrigerant gas density was measured. Isobutane was used as the refrigerant gas, and the refrigerant gas density was shown as a value (% LEL) in the case where a lower exploration limit (LEL) is 100% (1.8% V/V (volume density) in the isobutane).

The case where a hole was formed in the refrigerating cycle will be described with reference to FIGS. 12 to 20. In FIGS. 12 to 20, the inlet and outlet of the cold storage evaporator 16 are shown as R evaporator inlet and R evaporator outlet respectively. The inlet and outlet of the freezing evaporator 20 are shown as F evaporator inlet and F evaporator outlet respectively. Indication, "start of F leak" designates start of leak at the hole location A. Indication, "start of R leak" designates start of leak at the hole location B. Indication, "start of F leak" designates start of leak in the machine compartment.

(1) Normal Condition:

The following facts were found as the result of experiment although no graph is shown regarding the normal condition. During the F refrigeration, there is little difference between the inlet and outlet temperatures regarding each of the cold storage and freezing evaporators 16 and 20. Pump-down is carried out prior to the R refrigeration so that the refrigerant in the freezing evaporator 20 is absorbed by the compressor 24 thereby to be recovered. During the pump-down, the temperature at the outlet of the freezing evaporator 20 rapidly drops such that the temperature difference between the inlet and outlet is about 8 K. The temperature at the inlet of the cold storage evaporator 16 also drops rapidly such that the temperature difference between the inlet and outlet is about 30 K.

The temperature difference between the inlet and outlet of the cold storage evaporator 16 is about 5 K over the whole period of the R refrigeration. In the freezing evaporator 20, the temperature difference at the pump-down is reduced to become zero about seven minutes after start of R refrigeration. There is little difference between the temperatures at the inlet and outlet of the cold storage evaporator 16 during stop of the compressor 24. Further, the temperature at the inlet of the freezing evaporator 20 is increased such that the difference becomes about 5 K.

In the F refrigeration after stop of the compressor 24, the temperature at the inlet of the freezing evaporator 20 immediately after start of the F refrigeration, whereupon the difference between the inlet and outlet becomes about 7 K. However, the temperature difference becomes zero after about 20 minutes.

The load (input power) of the compressor motor 36 is about 60 W in the F refrigeration and about 80 W in the R refrigeration.

Figure 9:
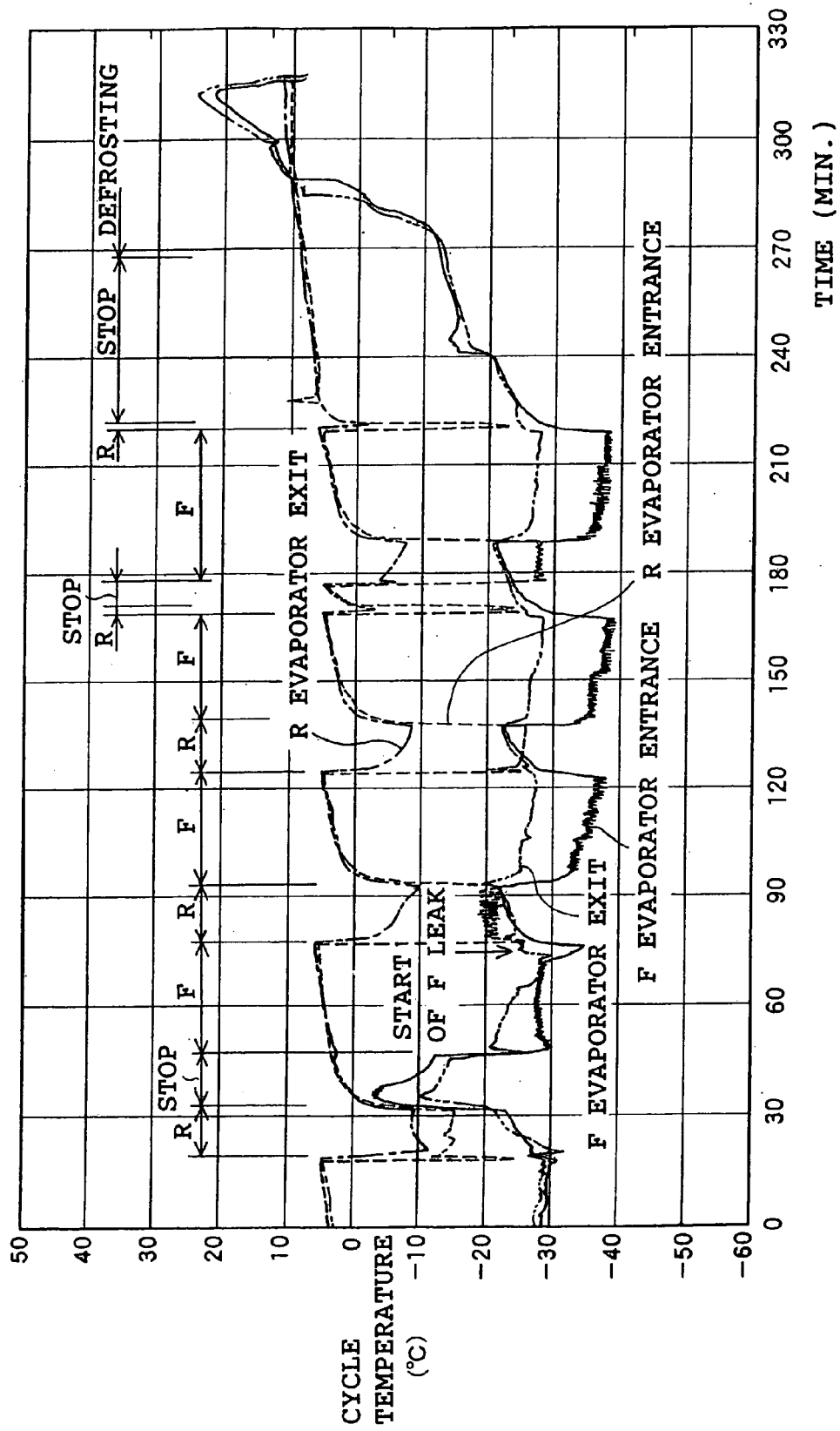
FIG. 9 shows changes in the temperatures at an inlet and outlet of the evaporator upon occurrence of damage at the freezing evaporator side respectively.
Figure 10:
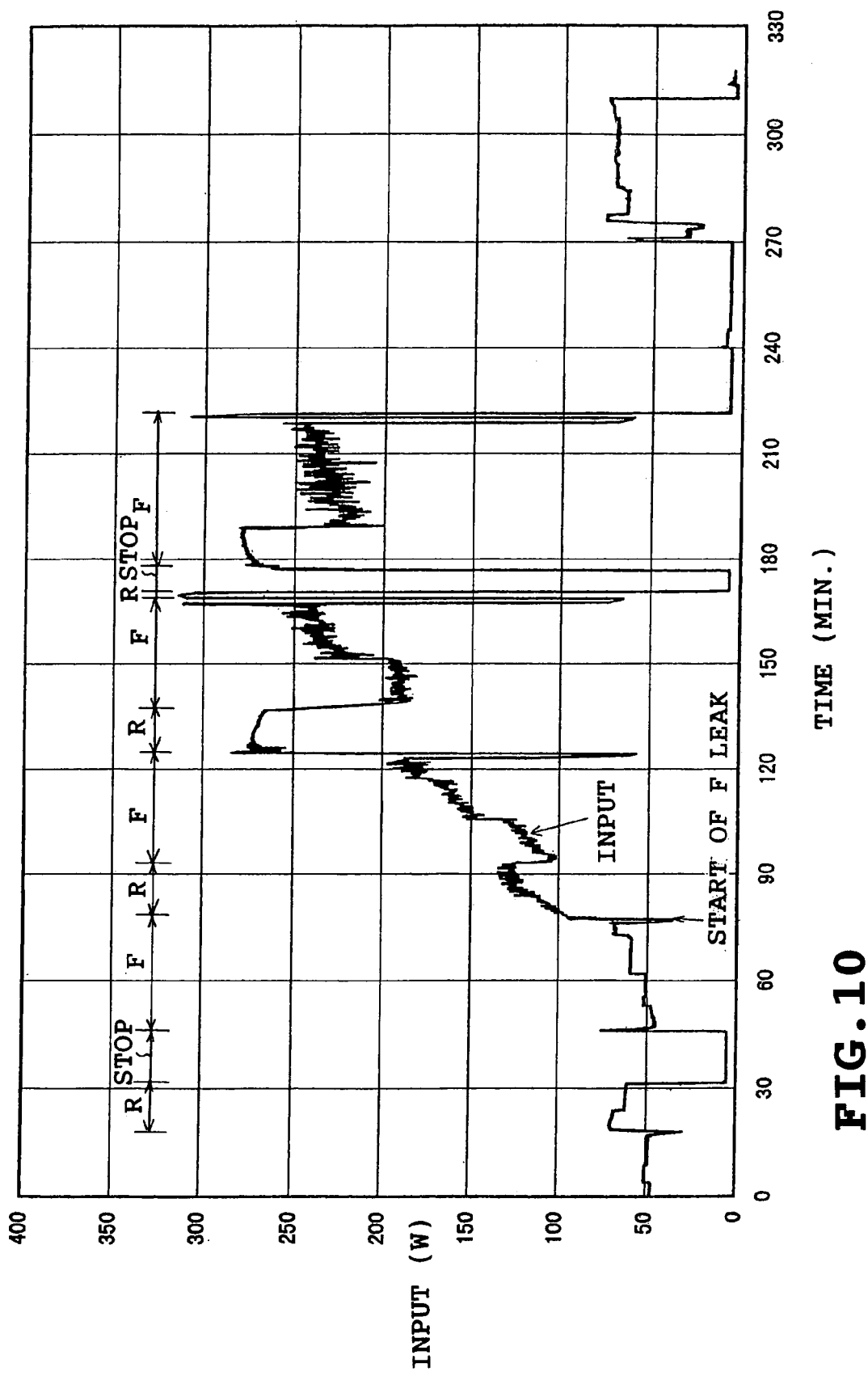
FIG. 10 shows changes in the load of the compressor.
Figure 11:
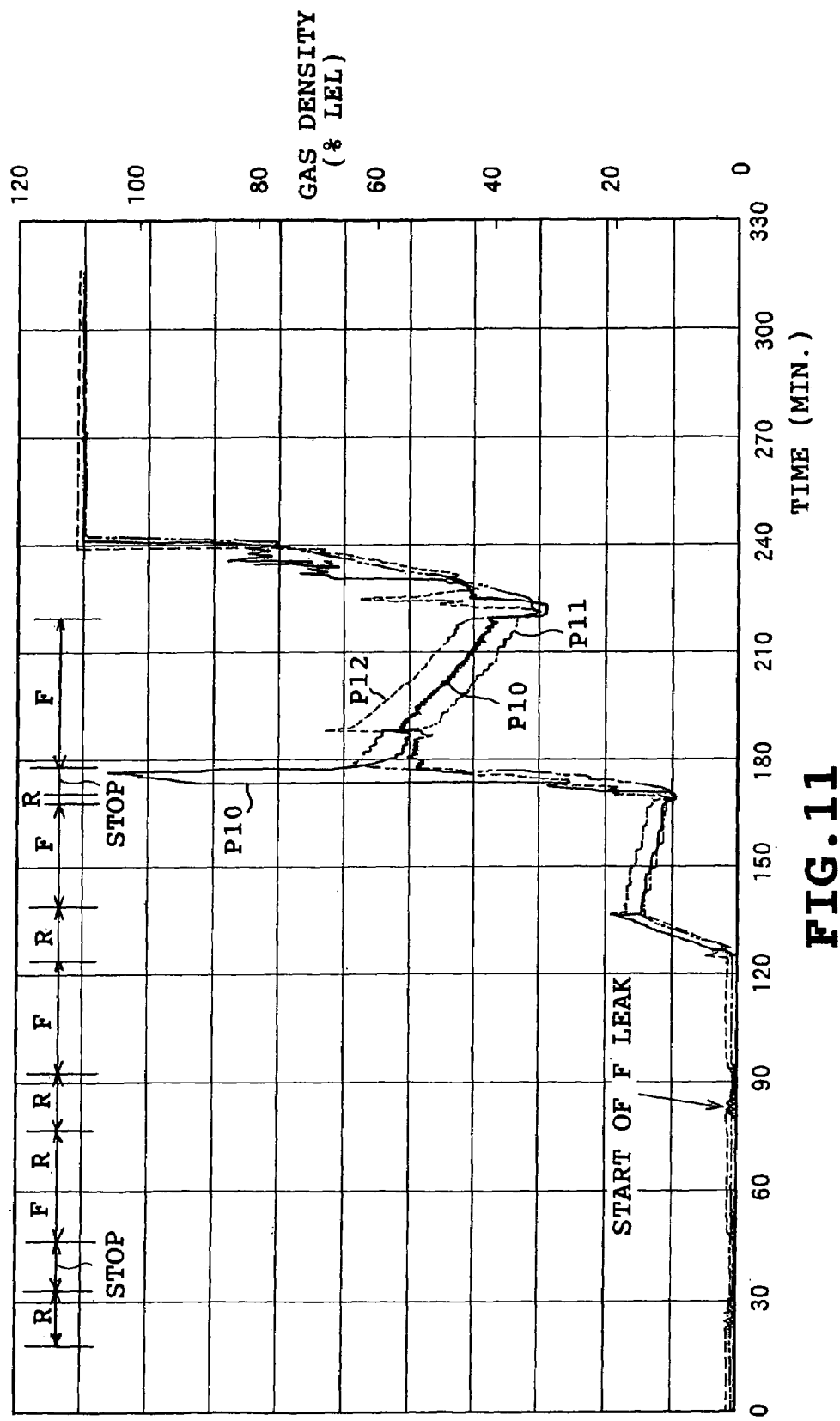
FIG. 11 shows changes in the density of refrigerant gas in the refrigerator.

(2) Occurrence of Hole in A:

FIG. 9 shows changes in the temperatures at outlets and inlets of the cold storage and freezing evaporators 16 and 20. FIG. 10 shows changes in the load (input power) of the compressor motor 36. FIG. 11 shows the refrigerant gas density in the refrigerator. The experiment started 23 minutes after start of the F refrigeration. The following facts can be found from the figures:

Immediately after formation of a hole in A, the temperature at the inlet of the freezing evaporator 20 starts dropping such that the temperature difference between the inlet and outlet becomes 10 K at maximum. The load (input power) of the compressor motor 36 is preliminarily reduced as the result of pump-down before start of R refrigeration. No refrigeration gas has leaked in the refrigerator. The temperature at the outlet of the cold storage evaporator 16 in the first R refrigeration becomes higher than that in the normal R refrigeration, whereas the temperature at the inlet becomes higher. The difference between temperatures at the outlet and inlet is about 16 K. This is considered to result from undercharge due to air sucked in the refrigerating cycle. In this case, the load of the compressor motor 36 is increased upon start of R refrigeration, reaching about 130 W at the end of R refrigeration. No refrigeration gas has leaked in the refrigerator in the R refrigeration, either.

In the second F refrigeration subsequent to the first R refrigeration, the temperature difference between the inlet and outlet of the freezing evaporator 20 is about 10 K. No refrigeration gas has leaked in the refrigerator. The load of the compressor motor 36 is increased to about 200 W.

The refrigerant leaks into the freezing compartment 9 in the second R refrigeration. The gas density is about 20% LEL and reaches 100% LEL in the third R refrigeration.

Figure 12:
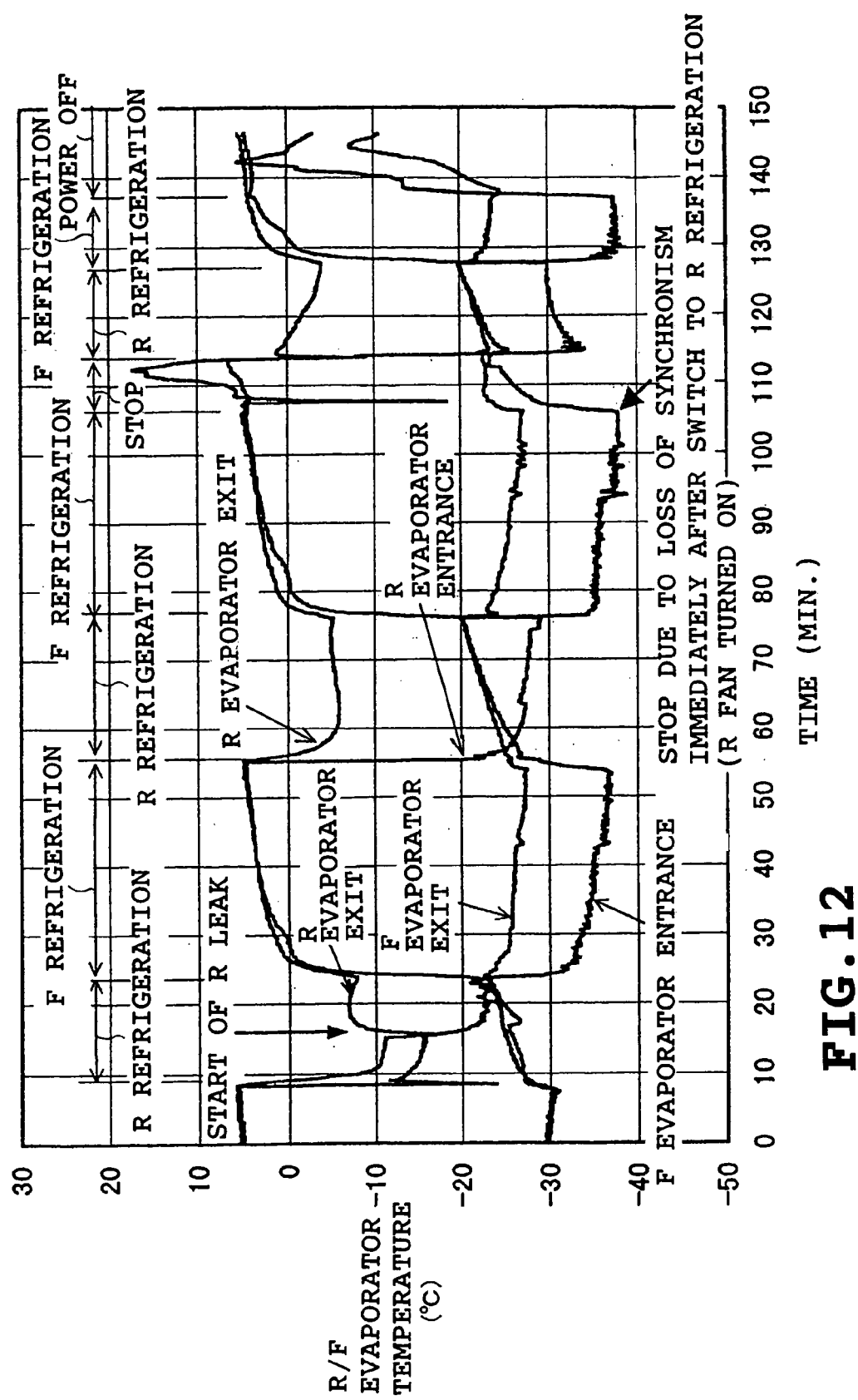
FIG. 12 shows changes in the temperatures at an inlet and outlet of the evaporator upon occurrence of damage at the freezing evaporator side respectively.
Figure 13:
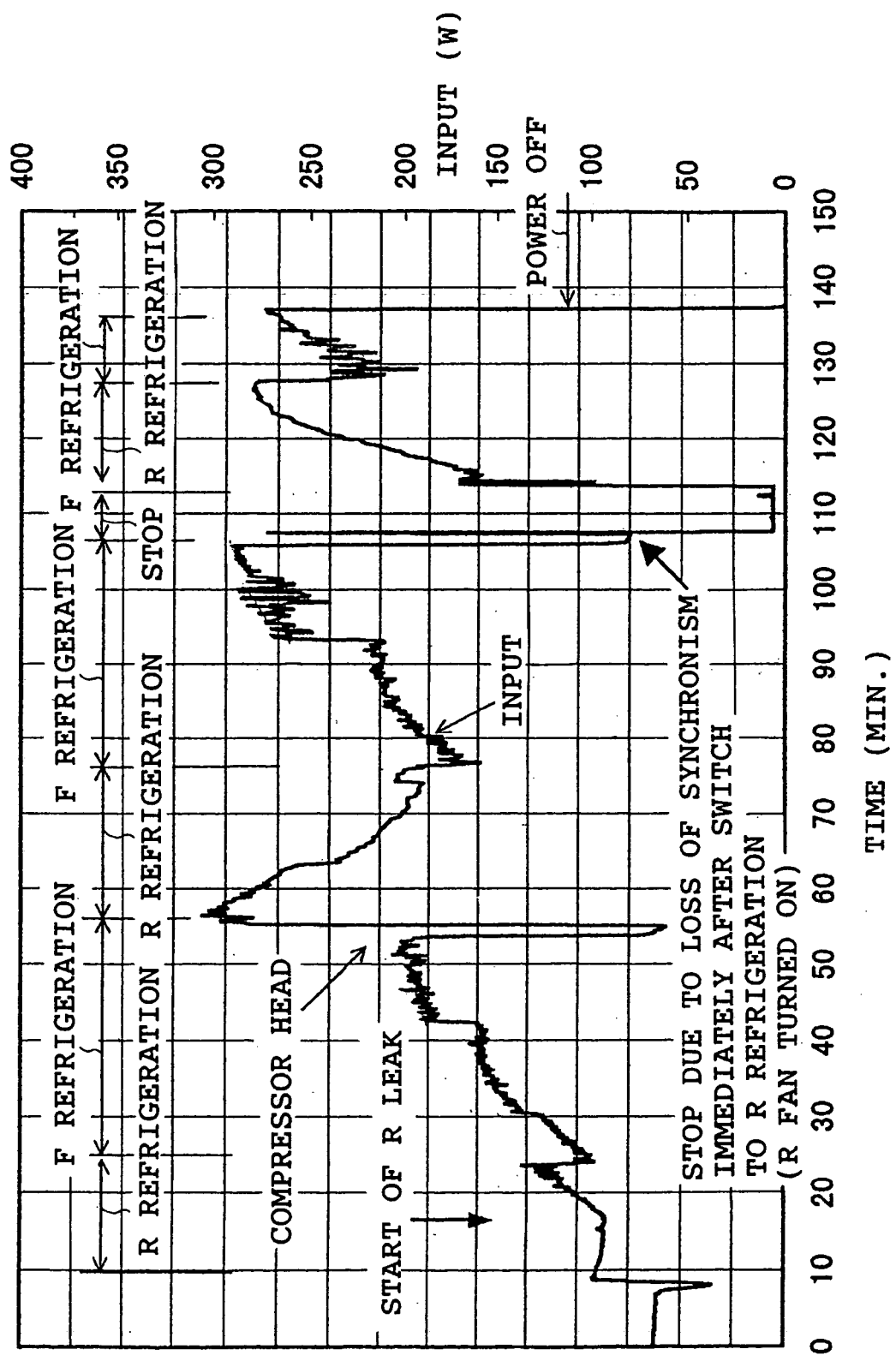
FIG. 13 shows changes in the load of the compressor.
Figure 14:
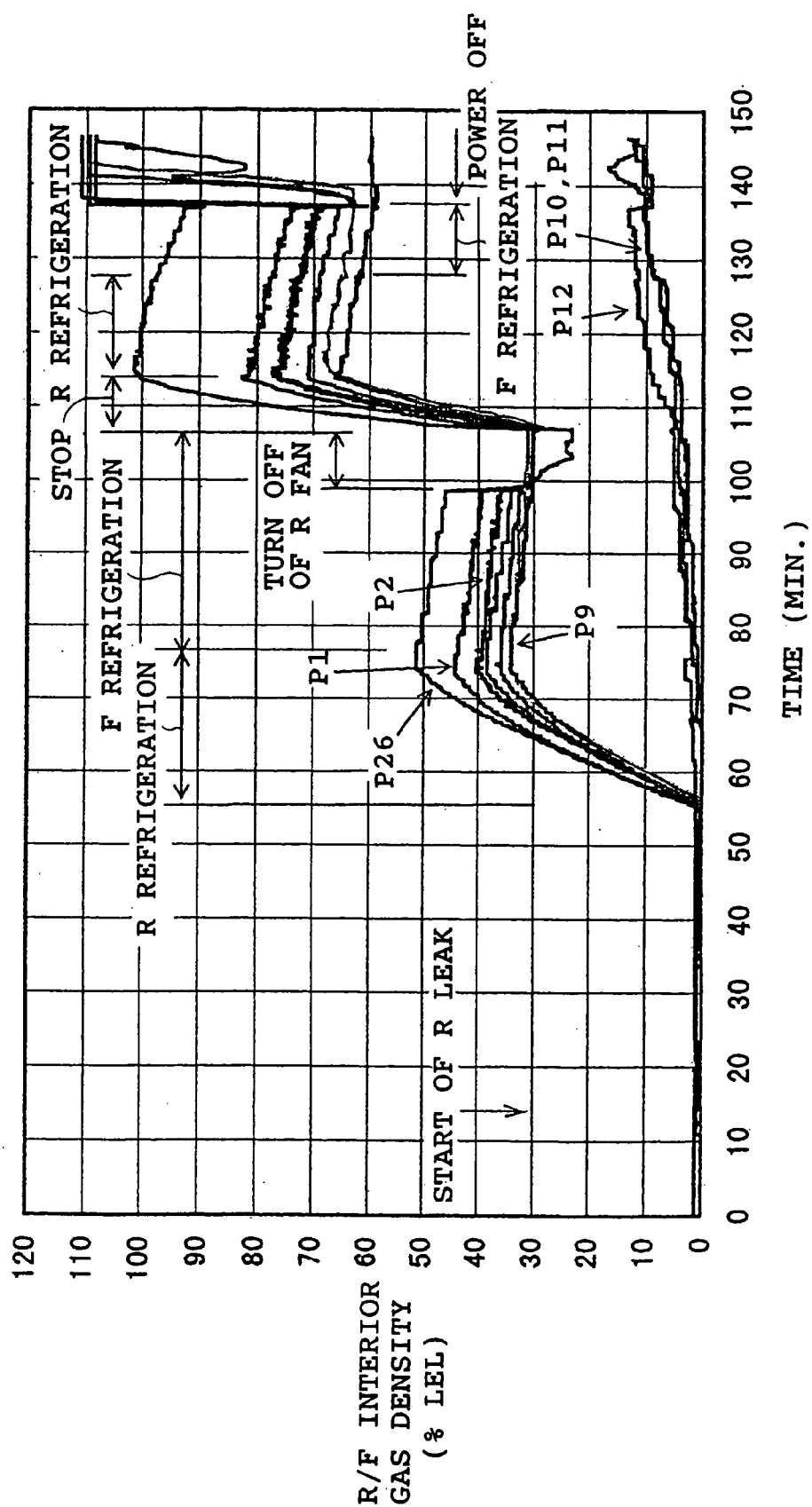
FIG. 14 shows changes in the density of refrigerant gas in the refrigerator.

(3) Occurrence of Hole in B:

FIG. 12 shows changes in the temperatures at outlets and inlets of the cold storage and freezing evaporators 16 and 20. FIG. 13 shows changes in the load of the compressor motor 36. FIG. 14 shows the refrigerant gas density in the refrigerator. The experiment started 5 minutes after start of the R refrigeration. The following facts can be found from the figures:

In synchronization with start of the experiment, the temperature at the inlet of the freezing evaporator 20 starts increasing such that the temperature difference between the inlet and outlet becomes about 16 K. The reason for this is that since air is sucked through the hole into the cold storage evaporator 16, the temperature at the outlet is increased and load is applied to the compressor 24 by invasion of air. The load of the compressor motor 36 reaches 130 W at the end of the R refrigeration, which is 50 W larger than the normal value of 80 W.

Regarding the freezing evaporator 20, no conspicuous temperature change was found although the temperature at the outlet slightly drops immediately after start of the experiment. No refrigeration gas leaks in the refrigerator in the R refrigeration.

The temperatures at the inlet and outlet of the cold storage evaporator 16 do not almost differ from each other when the operation of the refrigerator is switched from the R refrigeration to the F refrigeration. However, the temperature at the outlet of the freezing evaporator 20 is increased and the temperature at the inlet drops during the F refrigeration. The difference between both temperatures is about 10 K.

The load of the compressor motor 36 continues to increase, reaching 200 W at the end of the F refrigeration.

The load of the compressor motor 36 is preliminarily reduced as the result of pump-down after finish of the F refrigeration. No refrigeration gas leaks in the refrigerator in the F refrigeration, either.

In the second R refrigeration, the temperature at the outlet of the cold storage evaporator 16 rises, whereas the temperature at the inlet drops. The difference between the temperatures is about 21K. The refrigerant leaks into the interior of the refrigerator in the second R refrigeration and the gas density is increased to 50% LEL at maximum.

Further, the load of the compressor motor 36 is re-increased although it is preliminarily reduced by the pump-down. The load is increased to about 300 W immediately after occurrence of refrigerant leak and thereafter starts to reduce with leak. The reason for this is considered to be that the load of the compressor is reduced due to leak of the refrigerant outside the refrigerating cycle. The refrigerant leaks into the interior of the refrigerator in the second R refrigeration and the gas density is increased to 50% LEL at maximum.

The second F refrigeration is the same as the first one. The refrigerant stops leaking at the cold storage evaporator 16 side. Accordingly, the load of the compressor motor 36 is re-increased and is abnormally increased immediately after the R refrigeration, where upon the compressor motor 36 was interrupted due to increase in the current value. As the result of interrupt, the pressure is increased at the location of the hole such that an amount of gas leak into the interior of the refrigerator becomes large. As a result, the gas density exceeds 100% LEL at maximum.

As described above, when the hole is located at the low pressure side (A or B), no refrigerant leaks into the interior of the refrigerator immediately after formation of the hole. The refrigerant gradually leaks in the first or second R refrigeration. Before the R refrigeration in which the refrigerant leaks through either hole location A or B into the refrigerator interior, the temperature difference is about 16 K between the inlet and outlet of the freezing evaporator 16 and the temperature difference is about 10 K between the inlet and outlet of the freezing evaporator 20, resulting in an abnormal condition.

Figure 15:
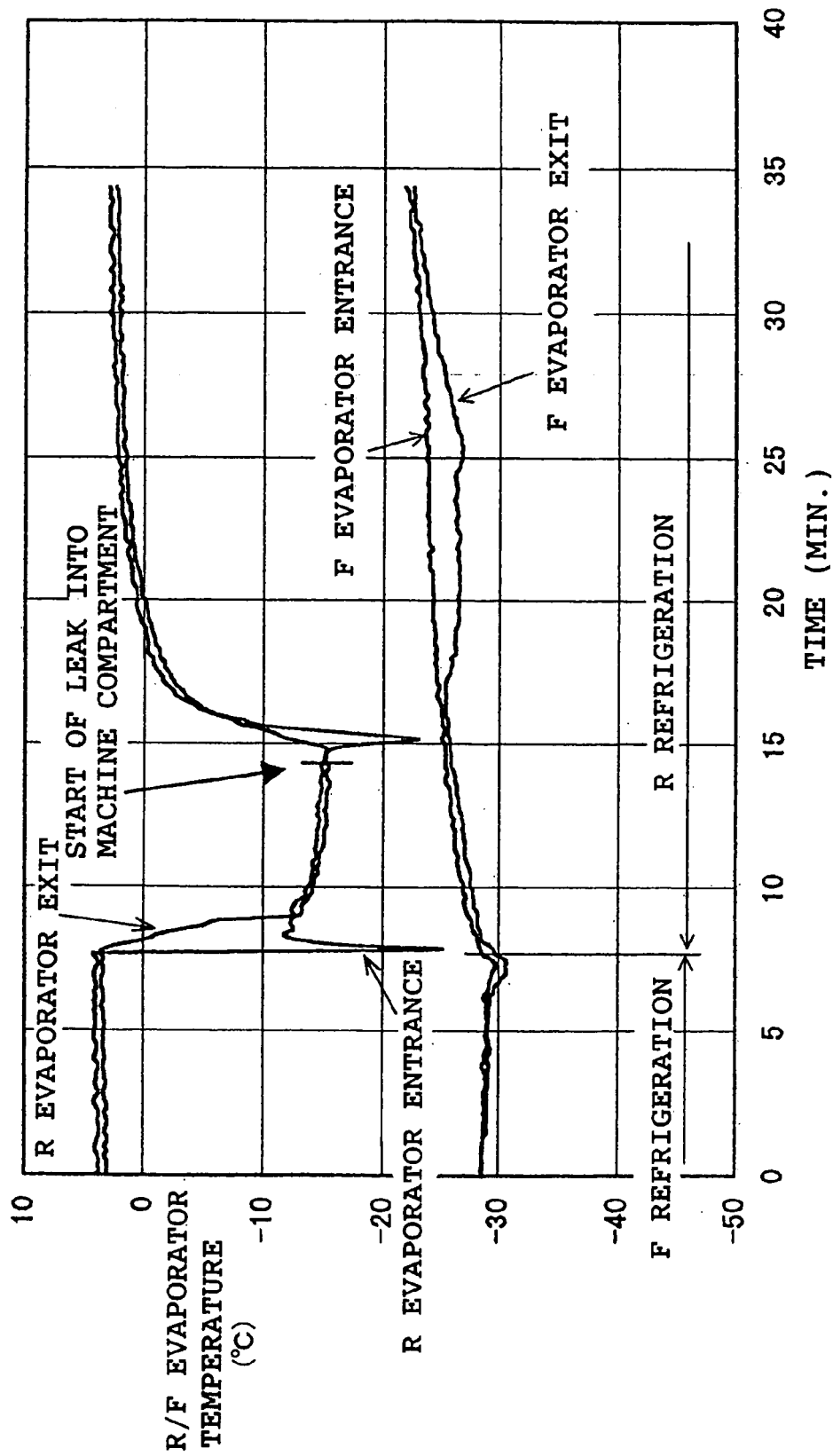
FIG. 15 shows changes in the temperatures at the inlet and outlet of the evaporator upon occurrence of damage at the discharge side of the compressor.
Figure 16:
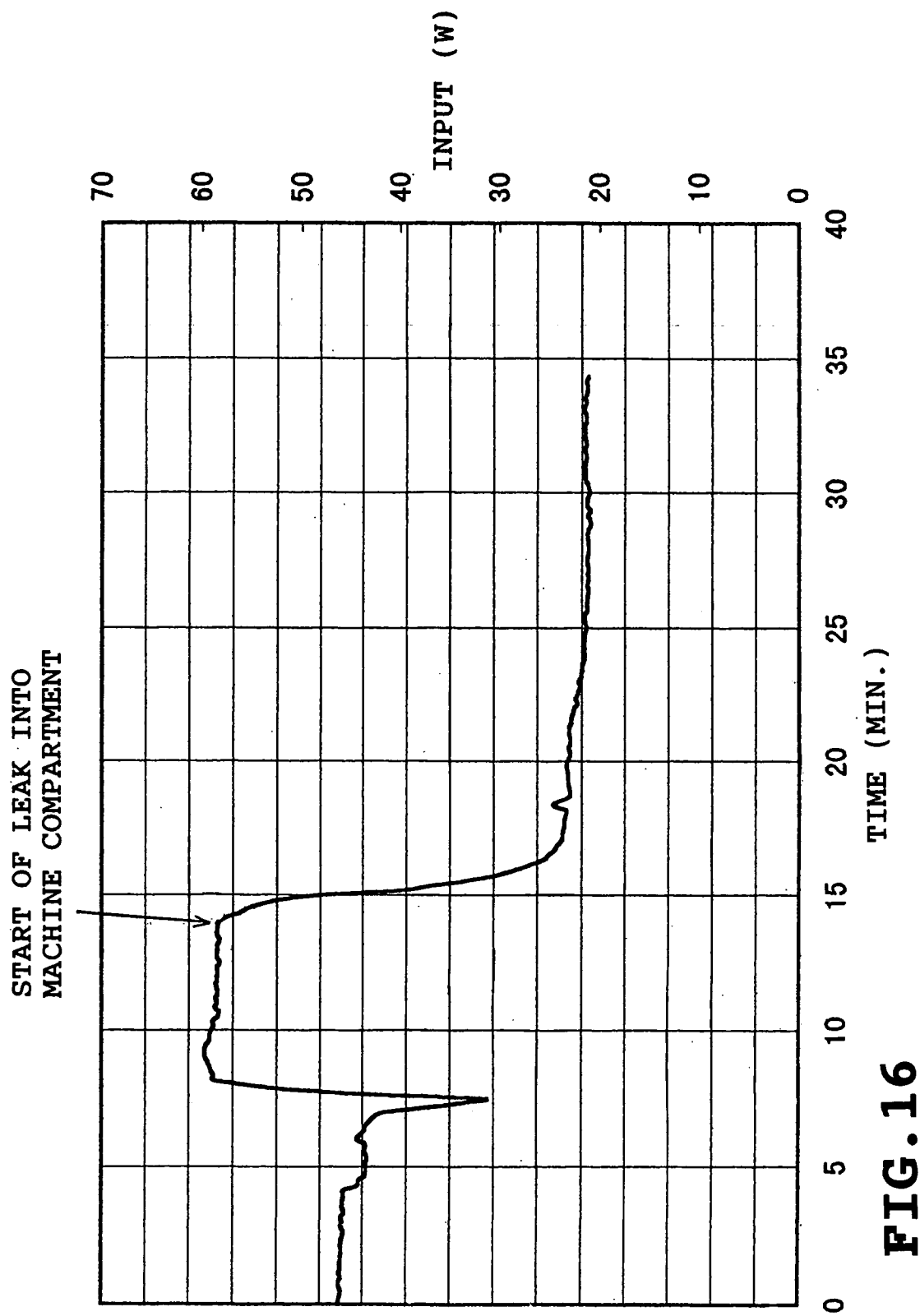
FIG. 16 shows changes in the load of the compressor.
Figure 17:
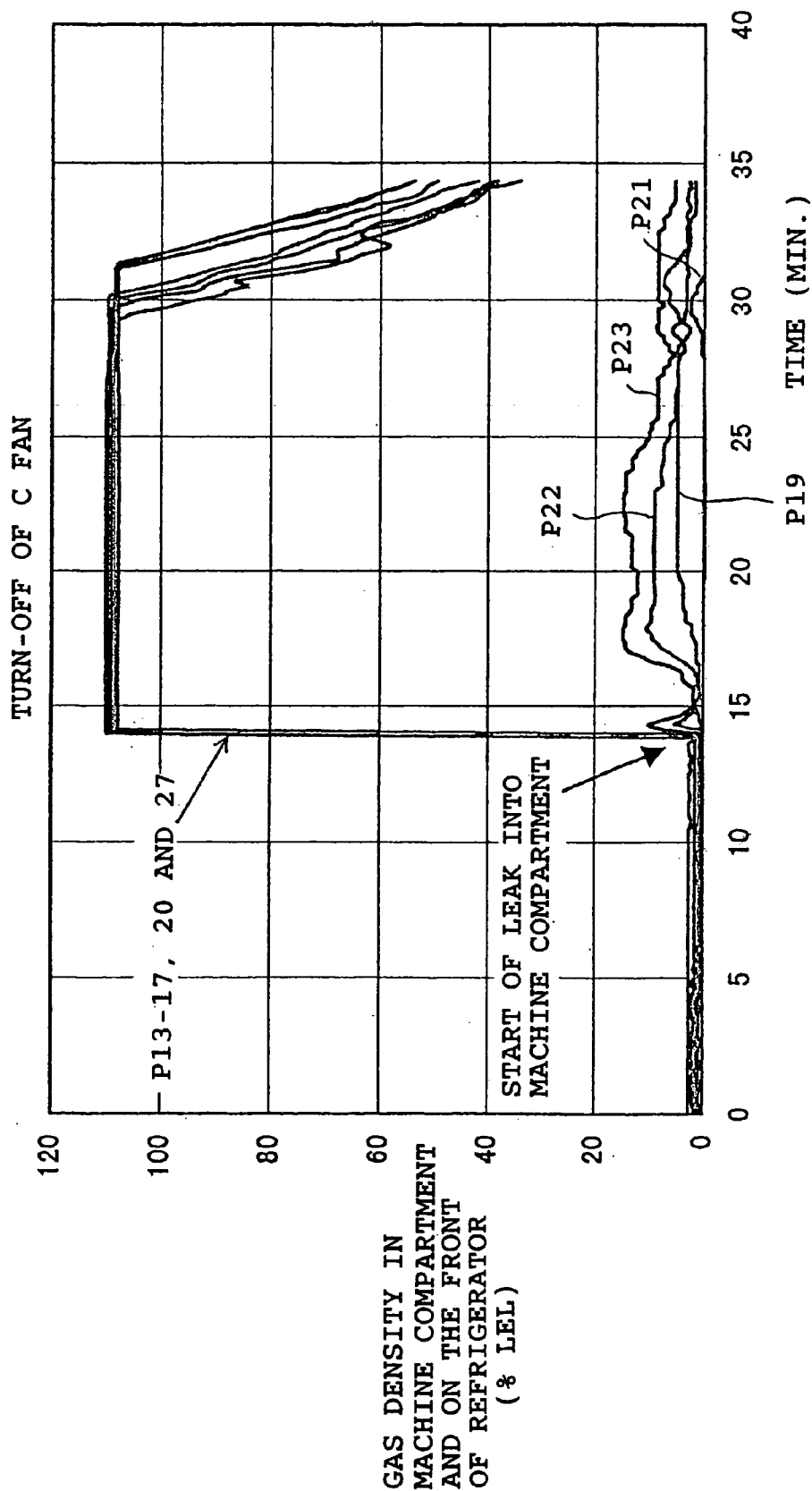
FIG. 17 shows changes in the density of refrigerant gas in the machine compartment while the C fan is stopped.
Figure 18:
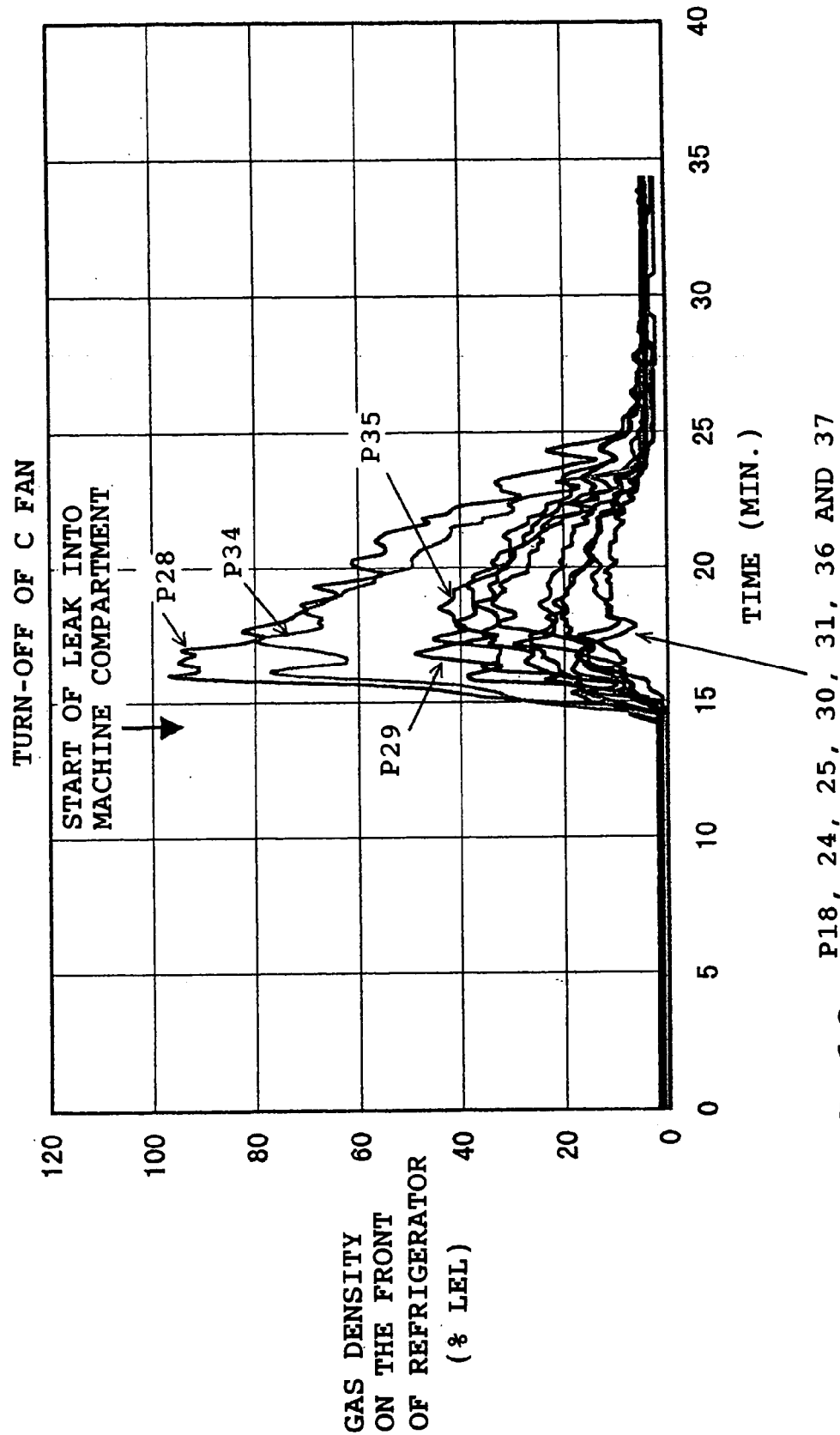
FIG. 18 shows changes in the density of refrigerant gas in the refrigerator front while the C fan is stopped.
Figure 19:
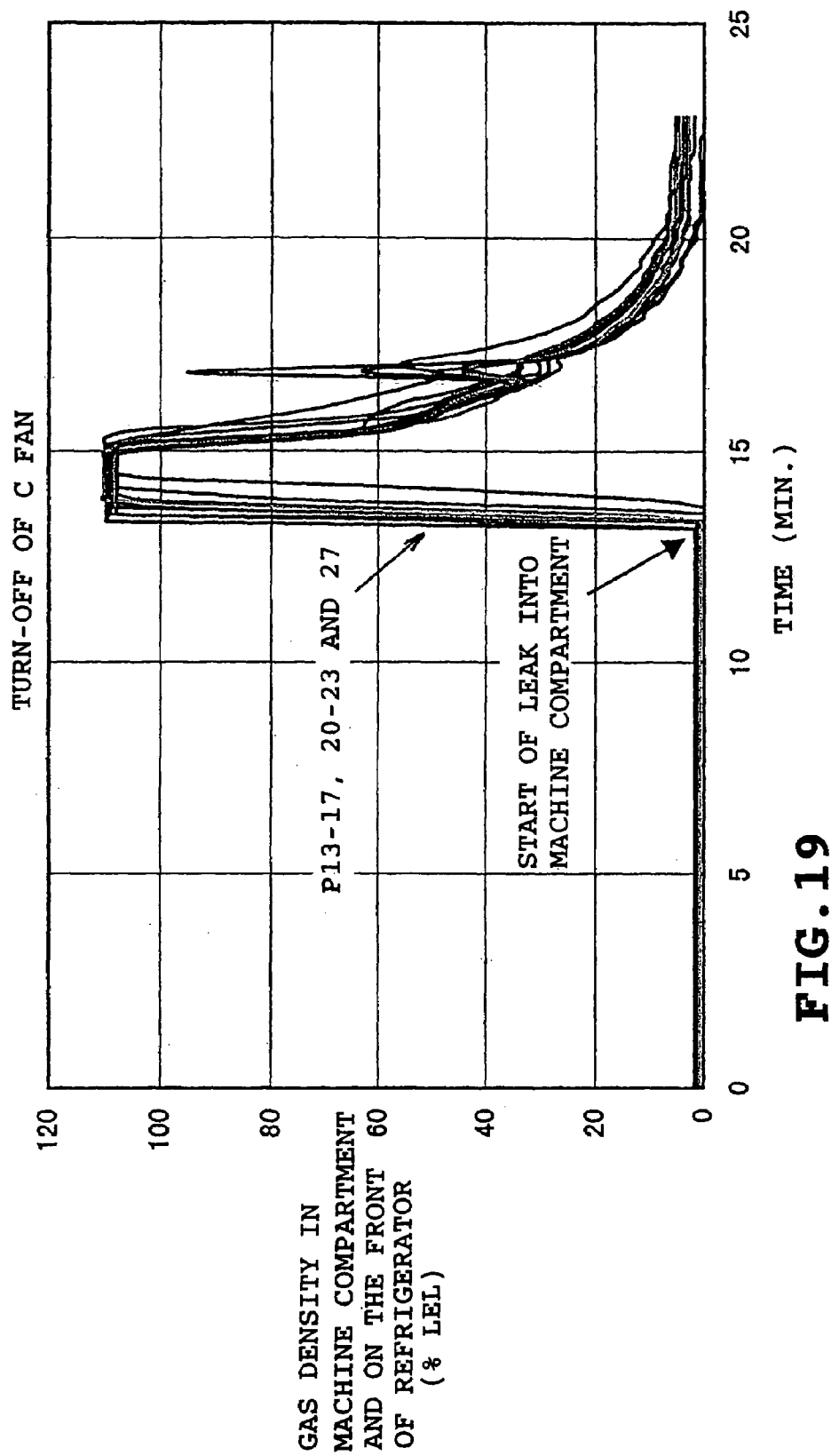
FIG. 19 shows changes in the density of refrigerant gas in the machine compartment while the C fan is in operation.
Figure 20:
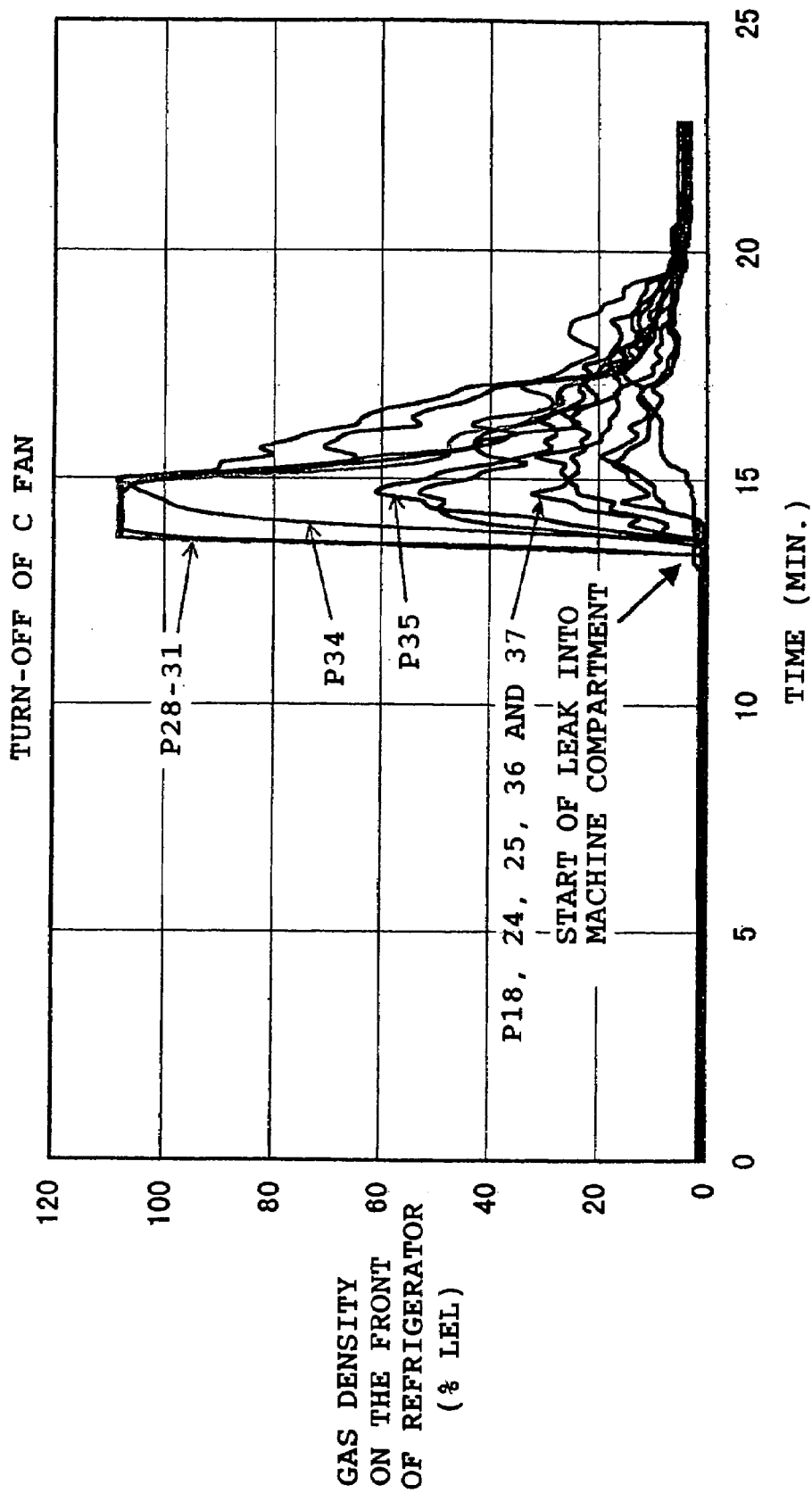
FIG. 20 shows changes in the density of refrigerant gas in the refrigerator front while the C fan is in operation.

(4) Occurrence of Hole in C:

FIG. 15 shows changes in the temperatures at outlets and inlets of the cold storage and freezing evaporators 16 and 20. FIG. 16 shows changes in the load (input power) of the compressor motor 36. FIGS. 17 and 18 show the refrigerant gas density in the machine compartment 23 and the front of the refrigerator in the case where the C fan 27 is not operated, respectively. FIGS. 19 and 20 show the refrigerant gas density in the machine compartment 23 and the front of the refrigerator in the case where the C fan 27 is operated, respectively. The experiment started 5 minutes after start of the R refrigeration. The following facts can be found from the figures:

When the C fan 27 side is holed, the refrigerant immediately leaks out of the refrigerating cycle since the side is a high pressure side. As a result, the gas density reaches 100% LEL in the machine compartment 23. Further, during stop of the C fan 27, the condition where the gas density in the machine compartment 23 exceeds 100% LEL continues for about 19 minutes. When the C fan 27 is in operation, the condition continues for about 2 minutes.

Both of the temperatures at inlets and outlets of the cold storage and freezing evaporators 16 and 20 rises almost without temperature difference since the refrigerant is lost rapidly upon occurrence of leak.

Upon leak of the refrigerant, the load of the compressor motor 36 rapidly decreases from about 60 W. The load decreases by more than 30 W relative to the value in the normal state, in 2 minutes (when the outside temperature is at 15° C.). The reason for this is considered to be that the load of the compressor is reduced due to leak of the refrigerant outside the refrigerating cycle.

The temperature difference occurs between the inlet and outlet of each evaporator 16 or 20 when the low pressure side is holed, as described in sections (1) to (4). However, there is a difference in the temperature between the inlet and outlet of the cold storage evaporator 16 even in the normal state. On the other hand, when the refrigerant leaks at the high pressure side, no temperature difference occurs between the inlet and outlet of each evaporator 16 or 20. Further, the temperature difference is increased between the inlet and outlet of the freezing evaporator 20 during the pump-down. Accordingly, it can be considered that the low pressure side would be holed when a temperature difference occurs between the inlet and outlet of the freezing evaporator 20, but it is not exact. On the other hand, the load of the compressor motor increases when the low pressure side is holed. However, the load of the compressor can be considered to increase also in the normal state. The refrigerant does not leak immediately when the low pressure side is holed.

When holing occurs at the high pressure side, the load of the compressor motor 36 rapidly decreases and the refrigerant leaks out simultaneously with holing. Accordingly, it is preferable to determine that the high pressure side is holed immediately when the load of the compressor motor 36 decreases.

Figure 1:
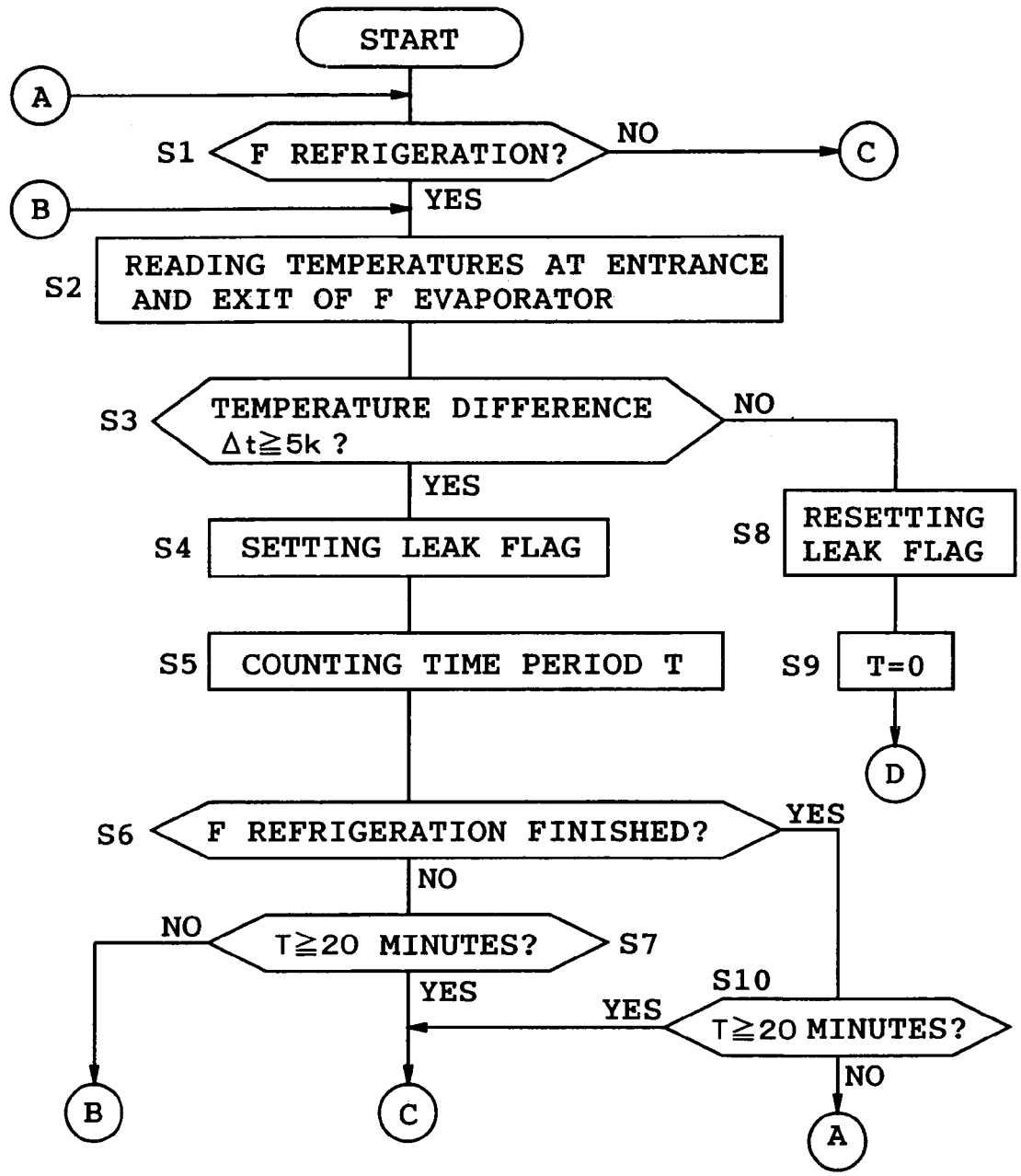
FIG. 1 is a flowchart No. 1 for damage detection, showing one embodiment of the present invention.
Figure 2A:
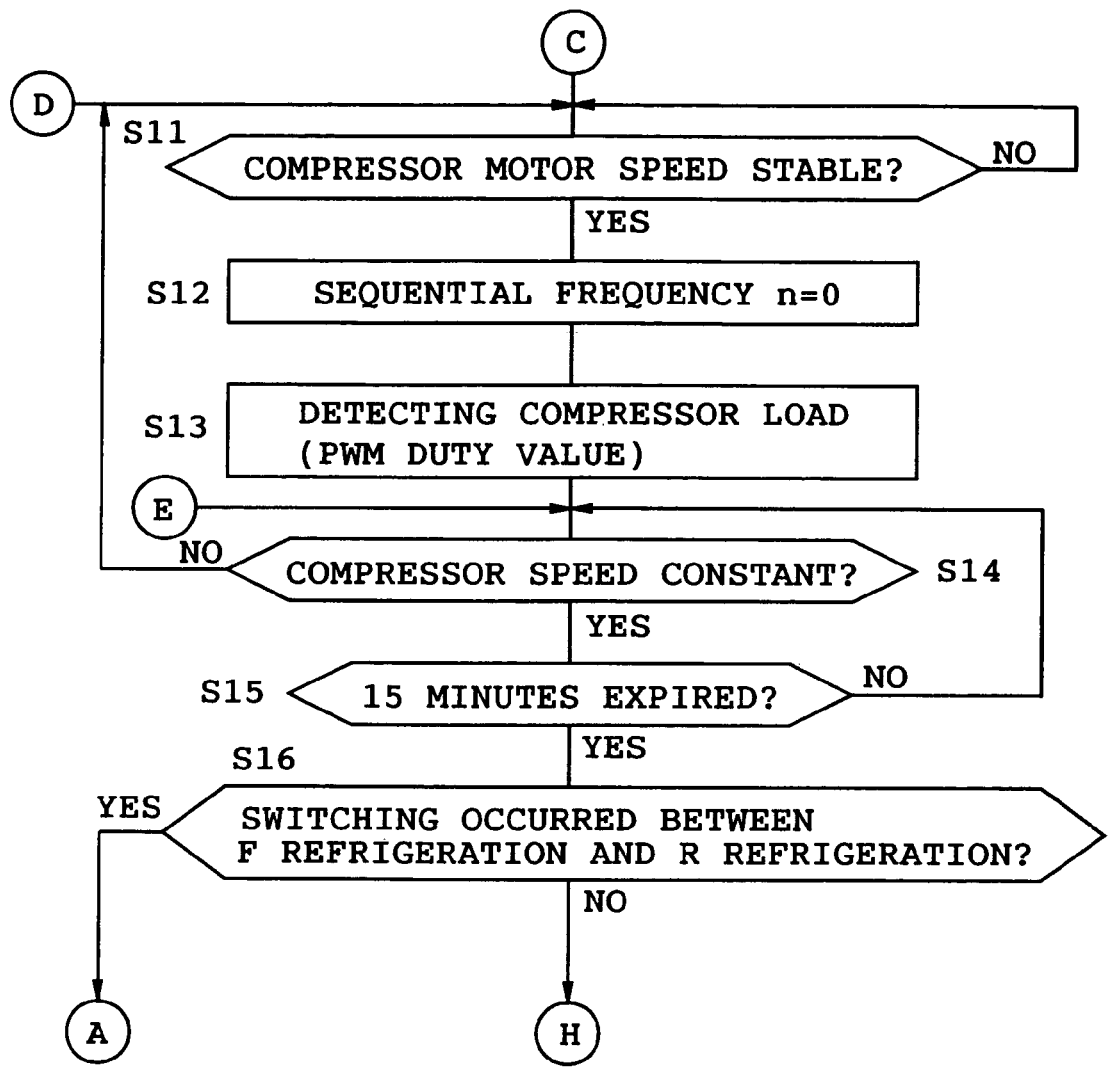
FIG. 2A is a flowchart No. 2.
Figure 2B:
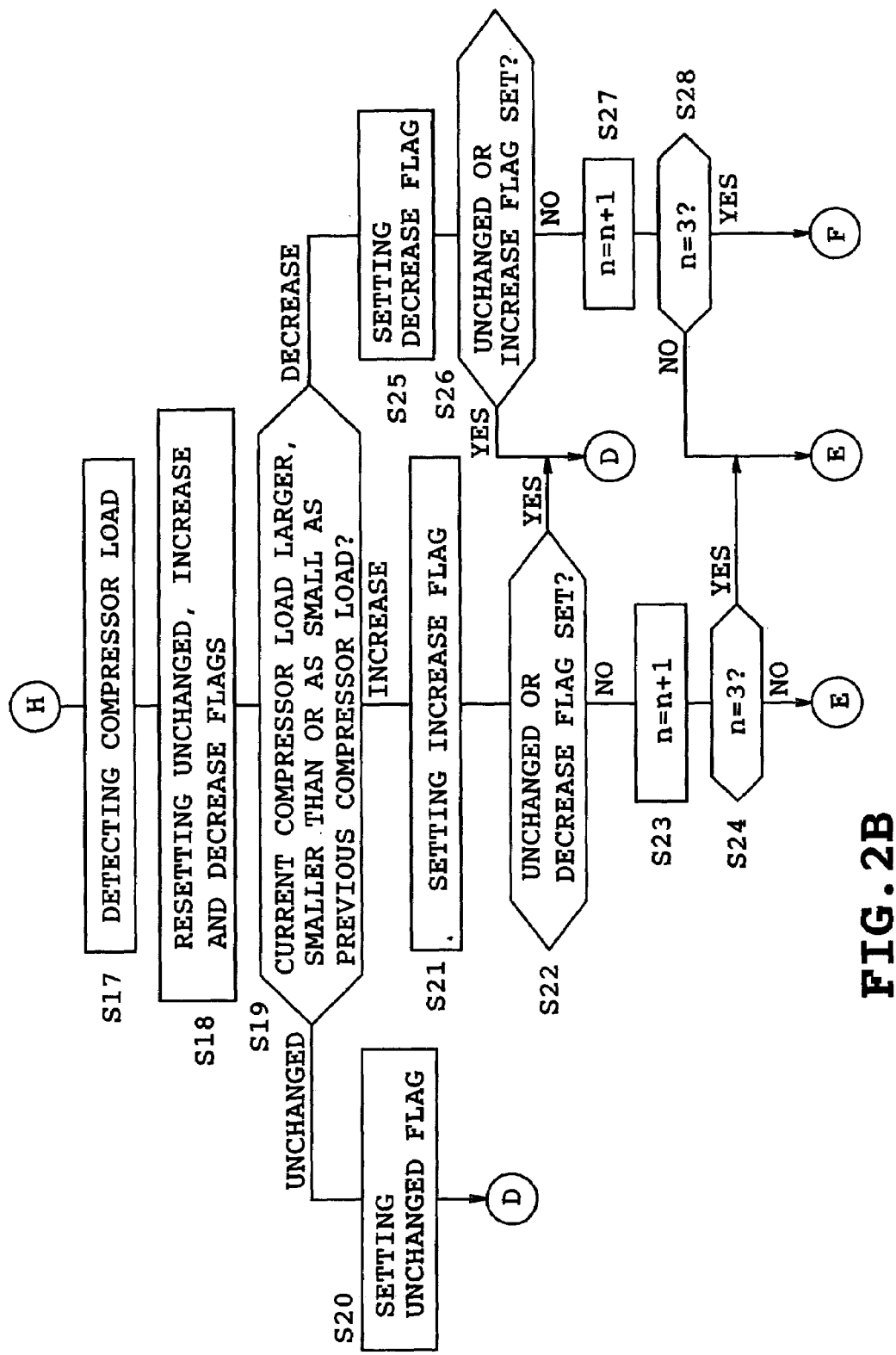
FIG. 2B is a flowchart No. 3.
Figure 3:
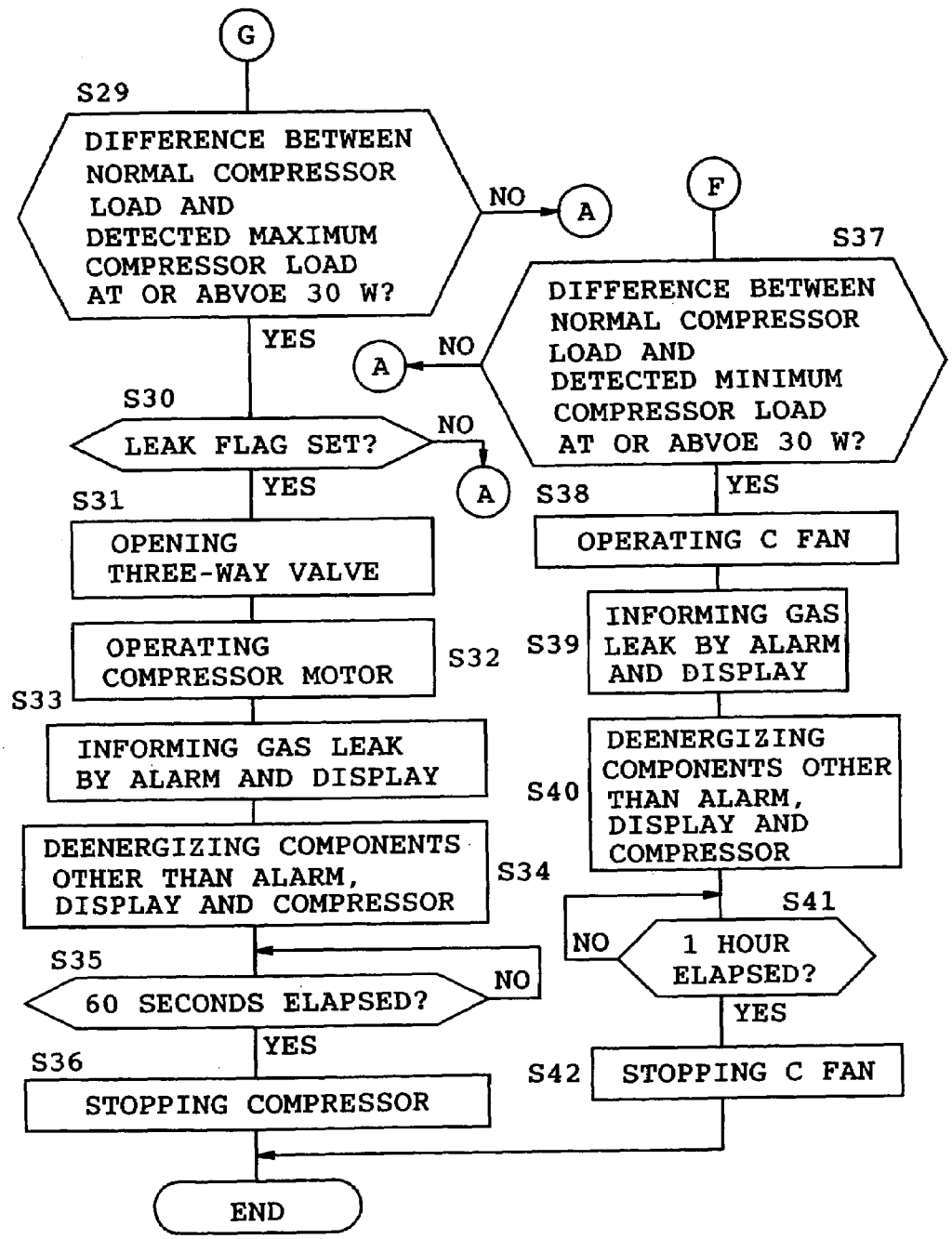
FIG. 3 is a flowchart No. 4.

Referring to the flowcharts of FIGS. 1 to 3, the following describes control contents of the main control device 43 detecting occurrence of damage causing gas leak.

Upon execution of the damage detecting routine, the main control device 43 determines whether the F refrigeration is being carried out (step S1). When the F refrigeration is being carried out (YES at step S1), the main control device 43 reads detection temperatures from the F entrance temperature sensor 55 and F exit temperature sensor 56 (step S2). The control device 43 then determines whether the difference in the temperature between the entrance and exit of the F refrigeration evaporator 20 is at or above 5 K (step S3). When the temperature difference is at or above 5 K (YES at step S3), the control device 43 sets a leak flag (step S4) and counts a time period T in which the temperature difference maintains the value at or above 5 K (step S5).

Subsequently, the control device 43 determines whether the F refrigeration has been finished (step S6). When the F refrigeration is continued (NO at step S6), the control device 43 then determines whether the time period T is equal to or larger than 20 minutes (step S7). When the time period T is smaller than 20 minutes (NO at step S7), the control device 43 returns to step S2 to read detection temperatures from the F entrance temperature sensor 55 and F exit temperature sensor 56. When the time period T is equal to or larger than 20 minutes during the F refrigeration (NO at step S6 and YES at step S7), the control device 43 advances to step S11 for detection of the load of the compressor 24 in FIG. 2. Further, when the time period T is not equal to or larger than 20 minutes upon finish of the F refrigeration although the temperature difference maintains the value at or above 5 K (YES at step S6 and NO at step S10), the control device 43 advances to step S1. When the temperature difference is at or above 5 K in the subsequent F refrigeration, the time period T is accumulated to that counted in the previous F refrigeration. The control device 43 advances to an initial step S11 for detection of load of the compressor 24 in FIG. 2 when the accumulated time period is at or above 20 minutes.

On the other hand, when the F refrigeration is not in operation after the main control device 43 has started a gas leak routine (NO at step S1), the control device 43 advances to an initial step S11 for detection of load of the compressor 24 in FIG. 2. Further, when the temperature difference between the entrance and exit of the F refrigeration evaporator 20 is below 5 K (NO at step S3), the control device 43 resets the leak flag (step S8) and then resets the time period T (step S9), advancing to step S11.

When advancing to step S11 in FIG. 2, the control device 43 detects the number of revolution (rotational speed) of the compressor motor 36 for a predetermined period of time and clears a sequential frequency n (step S12) when the rotational speed has become stable (YES at step S11). The control device 36 then reads a PWM duty value of the motor 36 to calculate the load (step S13). Thereafter, the control device 43 again reads a PWM duty value of the motor 36 to calculate the load (step S17) when the rotational speed of the compressor motor 36 is not changed for 15 seconds (alternately repeating steps S14 and S15 and YES at step S15 after laps of 15 seconds) and when the F refrigeration and the R refrigeration have not been switched (YES at step S16).

The control device 43 then resets the flags of UNCHANGED, INCREASE and DECREASE as will be described later (step S18). Subsequently, the control device 43 compares the currently detected load with the previously detected one (step S19). When there is no change, the control device 43 sets the UNCHANGED flag (step S21), then returning to step S11. When the current load is larger than the previous load as the result of comparison, the control device 43 sets the INCREASE flag (step S21), then determining whether the UNCHANGED or DECREASE flag has been set (step S22). The control device 43 returns to step S11 when the UNCHANGED or DECREASE flag has been set (YES at step S22).

When neither UNCHANGED nor DECREASE flag has been set (NO at step S22), the control device 43 increases the sequential frequency n (step S23). The control device 43 then determines whether n is 3 (step S24). When the sequential frequency n is below 3 (NO at step S24), the control device 43 returns to step S14 to re-read the PWM duty value of the compressor motor 36 to calculate the load. When the foregoing operation is repeated such that the sequential frequency n has reached 3 (YES at step S24), the control device 43 advances to step S29 as a determining step.

Further, when the current load is smaller than the previous load as the result of comparison at step S19, the control device 43 sets the DECREASE flag (step S25), then determining whether the UNCHANGED or INCREASE flag has been set (step S26). The control device 43 returns to step S11 when either UNCHANGED or INCREASE flag has been set (YES at step S26).

When neither UNCHANGED nor INCREASE flag is set (NO at step S26), the control device 43 increases the sequential frequency n (step S27) and then determines whether the sequential frequency n has reached 3 (step S28). When the sequential frequency n is smaller than 3 (NO at step S28), the control device 43 returns to step S14 to read the PWM duty value of the compressor motor 36 to calculate the load. When the foregoing operation is repeated and the sequential frequency has reached 3 (YES at step S24), the control device 43 advances to step S37 as a determining step.

The control device 43 returns to step S11 when the rotational speed of the compressor motor 36 changes during repeated detection of its load as described above (NO at step S14). The control device 43 returns to step S1 when switching is carried out between the F refrigeration and the R refrigeration (YES at step S16).

The control device 43 returns to step S29 when the load of the compressor motor 36 is detected at intervals of 15 seconds and the current load is smaller than the previous load at three consecutive times. In step S29, the control device 43 determines whether the difference between the last detected load and the normal load of the compressor motor 36 is at or above 30 W. When the difference is below 30 W (NO at step S29), the control device 43 returns to step S1 since it is considered that the load reduction is due to the reason other than damage to the refrigerating cycle.

When the load difference is at or above 30 W (YES at step S29), the control device 43 determines whether the leak flag has been set (step S30). When the leak flag has not been set (NO at step S30), the control device 43 returns to step S1 since it is considered that the load reduction is due to the reason other than damage to the refrigerating cycle.

When the leak flag has been set (YES at step S30), the control device 43 closes the three-way valve 29 since it is considered that damage has occurred at the low pressure side (step S31). The control device 43 then carries out forced operation of the compressor 24 (step S32). Subsequently, an alarm 51 is operated and a display 50 is caused to display "GAS LEAKED" (step S33). The control device 43 deenergizes the electrical components other than the alarm 51, display 50 and compressor 24 (step S34). Subsequently, the control device 43 stops the compressor 24 (step S36) upon lapse of 60 seconds (YES at step S35), ending the routine.

On the other hand, the control device 43 advances to step S37 when the load of the compressor motor 36 is detected at intervals of 15 seconds and the current load is larger than the previous load at three consecutive times. In step S37, the control device 43 determines whether the difference between the last detected load and the normal load of the compressor motor 36 is at or above 30 W. When the difference is below 30 W (NO at step S37), the control device 43 returns to step S11 since it is considered that the load reduction is due to the reason other than damage to the refrigerating cycle.

When the load difference is at or above 30 W (YES at step S37), the control device 43 starts forced operation of the C fan 27 so that the refrigerant gas remaining in the machine compartment 23 is discharged (step S38). The alarm 51 is operated and the display 50 is caused to display "GAS LEAKED" (step S39). The control device 43 deenergizes the electrical components other than the alarm 51, display 50 and compressor 24 (step S40). Subsequently, the control device 43 stops the C fan 27 (step S42) upon lapse of 1 hour (YES at step S41), ending the routine.

According to the embodiment, the compressor 24 is operated with the three-way valve 29 being closed when damage has occurred at the low pressure side. Accordingly, the refrigerant remaining in both evaporators 16 and 20 located downstream relative to the three-way valve 29 can be confined between the compressor 24 and the three-way valve 29, so that the refrigerant gas can be prevented from leaking into the interior of the refrigerator. Further, since the pilot lamp 49, optical plasma deodorizer and the like disposed in the refrigerator are deenergized, the refrigerant could be prevented from catching fire even if the refrigerant gas should leak into the interior of the refrigerator.

Further, upon occurrence of damage at the high pressure side, the compressor 24 is interrupted so that the refrigerant gas is prevented from leaking into the machine compartment 23, and the C fan 27 is operated so that the refrigerant gas having leaked into the machine compartment 23 is discharged outside. Consequently, the refrigerant gas can be prevented from catching fire in the machine compartment 23.

Moreover, upon occurrence of damage, the leak of refrigerant gas is informed by the alarm 51 and the display 50. Consequently, since a suitable measure such as fire extinguishing can be taken when a stove or the like is installed near the refrigerator, the refrigerant gas can be prevented from catching fire.

The present invention should not be limited to the foregoing embodiment described with reference to the drawings but the following modification can be made.

The check valve is provided between the compressor and the evaporators 16 and 20 when the compressor is of the rotary type which is provided with no check valve.

The valve unit should not be limited to the three way valve 29 and may be constructed by another valve.

The valve unit may be provided in the midst of the condenser 25 if a capacity sufficient to confine the refrigerant is ensured.

The invention may be applied to a refrigerating cycle in which the operation mode is switched between the case where the refrigerant is supplied to the cold storage evaporator 16 and the freezing evaporator 20 in turn and the case where the refrigerant is supplied only to the freezing evaporator 20. In this case, the three-way valve provided for switching the operation mode may serve as the valve unit.

Input current of the compressor motor 36 may be detected for the purpose of load detection.

In the invention, the damage in the refrigerating cycle refers to all the causes resulting in gas leak, including the case where any component of the refrigerating cycle has been holed and occurrence of a crack.

The damage may be detected on the basis of only the load of the compressor 24.

INDUSTRIAL APPLICABILITY

As described above, the present invention involves the utility as a refrigerator which is provided with a refrigerating cycle in due consideration of global environment by employment of a flammable non-fleon refrigerant and particularly which has a high usability in the security.

The invention claimed is:

1. A refrigerator in which a refrigerating cycle provided with a compressor, a condenser, an expander and an evaporator is filled with a flammable refrigerant, characterized by:
   a load detector detecting a change in load of the compressor; and
   a control device detecting a damage which is a cause for leak of the refrigerant from the refrigerating cycle, based on a detection output of the load detector.

2. A refrigerator according to claim 1, characterized in that:
   the compressor includes, as a drive source, an electric motor driven by an inverter controlling input to the motor by pulse width modulation; and
   the load detector detects the change in the load of the compressor by a duty value of the pulse width modulation for controlling the inverter.

3. A refrigerator according to claim 1 or 2, characterized in that the control device determines which a part of the refrigerating cycle in which the damage has been produced, a high pressure side from the compressor to the expander or a low pressure side from the expander to the compressor, on the basis of increase or decrease in the load of the compressor indicated by the detection output of the load detector.

4. A refrigerator according to claim 3, characterized in that when the detection signal of the load detector indicates that the load of the compressor is at or above a predetermined value relative to a normal state, the control device determines that the damage has occurred at the low pressure side.

5. A refrigerator according to claim 3, characterized in that when the detection signal of the load detector indicates that the load of the compressor is at or below a predetermined value relative to a normal state, the control device determines that the damage has occurred at the high pressure side.

6. A refrigerator according to claim 3, characterized by an informing unit and a deenergizing unit deenergizing electric components in the refrigerator, and in that upon occurrence of a damage at the low pressure side, the control device operates the informing unit so that an informing operation is carried out and operates the deenergizing unit so that a deenergizing operation is carried out.

7. A refrigerator according to claim 3, characterized by a reverse flow preventing unit preventing the refrigerant from reverse flow from the compressor to the evaporator and a valve unit opening and closing a refrigerant passage from the condenser to the evaporator side, and in that upon occurrence of a damage at the low pressure side, the control device operates the valve unit so that the valve unit opens the refrigerant passage and drives the compressor so that the refrigerant is confined in a refrigerant passage between the reverse flow preventing unit and the valve unit.

8. A refrigerator according to claim 3, characterized by a machine compartment defined outside the refrigerator and enclosing the compressor and a cooling fan unit, and in that upon occurrence of a damage at the high pressure side, the control device operates the cooling fan unit.

9. A refrigerator according to claim 3, characterized by an informing unit, a deenergizing unit deenergizing electric components in the refrigerator, and a machine compartment defined outside the refrigerator and enclosing the compressor and a cooling fan unit, and in that upon occurrence of a damage at the high pressure side, the control device operates the informing unit so that an informing operation is carried out and operates the deenergizing unit so that a deenergizing operation is carried out for predetermined electric components other than the cooling fan unit.

10. A refrigerator according to claim 1, characterized by temperature sensors detecting temperatures at an inlet side and an outlet side of the evaporator respectively, and in that the control device determines leak of the refrigerant on the basis of a difference between the temperatures detected by the temperature sensors.

* * * * *